(12) United States Patent
Becker

(10) Patent No.: US 7,606,592 B2
(45) Date of Patent: Oct. 20, 2009

(54) WAVEGUIDE-BASED WIRELESS DISTRIBUTION SYSTEM AND METHOD OF OPERATION

(76) Inventor: Charles D. Becker, 14507 Circle A Trail, Helotes, TX (US) 78023

( * ) Notice: Subject to any disclaimer, the term of this patent is extended or adjusted under 35 U.S.C. 154(b) by 259 days.

(21) Appl. No.: 11/521,211

(22) Filed: Sep. 14, 2006

(65) Prior Publication Data

US 2007/0063914 A1 Mar. 22, 2007

Related U.S. Application Data

(60) Provisional application No. 60/718,419, filed on Sep. 19, 2005.

(51) Int. Cl.
*H04B 7/00* (2006.01)
(52) U.S. Cl. ............... 455/523; 455/67.11; 333/245; 333/248; 330/95
(58) Field of Classification Search ............... 455/523, 455/328; 343/772, 840
See application file for complete search history.

(56) References Cited

U.S. PATENT DOCUMENTS

| | | | |
|---|---|---|---|
| 2,206,923 A | 7/1940 | Southworth | |
| 2,404,086 A | 7/1946 | Okress et al. | |
| 2,419,613 A | 4/1947 | Webber | |
| 2,442,606 A | 6/1948 | Korman | |
| 2,557,391 A | 6/1951 | Okress | |
| 2,605,413 A | 7/1952 | Alvarez | |
| 2,694,183 A | 11/1954 | Edlen et al. | |
| 2,704,348 A | 3/1955 | Carlin | |
| 2,796,587 A | 6/1957 | Phillips | |
| 2,873,430 A | 2/1959 | Tomiyasu | |
| 2,932,823 A | 4/1960 | Beck et al. | |
| 3,327,249 A | 6/1967 | Manfanovsky et al. | |
| 3,340,959 A | 9/1967 | Wilson | |
| 3,972,013 A | 7/1976 | Shapiro | |
| 4,513,223 A * | 4/1985 | Chodorow | 315/4 |
| 4,721,930 A * | 1/1988 | Cohen | 333/137 |
| 4,912,367 A * | 3/1990 | Schumacher et al. | 315/3.5 |
| 4,968,978 A * | 11/1990 | Stolarczyk | 340/854.6 |
| 4,972,503 A | 11/1990 | Zurlinden | |
| 5,100,086 A | 3/1992 | Rinderer | |

(Continued)

OTHER PUBLICATIONS

*Times Microwave Systems*, Wallingford, CT Data Sheet: T-RAD-600.

(Continued)

*Primary Examiner*—Duc Nguyen
*Assistant Examiner*—Hai V Nguyen
(74) *Attorney, Agent, or Firm*—Morgan, Lewis & Bockius LLP; Thomas E. Nelson; Bradford A. Cangro

(57) ABSTRACT

The design and use of a simplified, highly efficient, waveguide-based wireless distribution system are provided. A low-loss waveguide is used to transport wireless signals from a signal source or sources to one or more receiver locations. One or more adjustable signal coupling devices partially insert into the waveguide at predetermined locations along the length of the system to provide variable, controlled extraction of one or more wireless signals. Low-loss impedance matching circuitry is provided between the waveguide coupling devices and output connectors to maintain high system efficiency. The system offers the capability of supplying signals of high strength and high quality to a large number of receivers in a wide wireless coverage area via a plurality of signal radiators. Some embodiments of the system are readily adaptable for wireless distribution service in HVAC plenum spaces. A system that combines the functions of fire extinguishing and waveguide wireless distribution is also disclosed.

51 Claims, 16 Drawing Sheets

U.S. PATENT DOCUMENTS

| | | | |
|---|---|---|---|
| 5,141,131 A | 8/1992 | Miller, Jr. et al. | |
| 5,181,934 A * | 1/1993 | Stolarczyk | 299/1.2 |
| 5,268,683 A * | 12/1993 | Stolarczyk | 340/854.4 |
| 5,502,394 A * | 3/1996 | Piau | 324/646 |
| 5,580,014 A | 12/1996 | Rinderer | |
| 5,592,438 A * | 1/1997 | Rorden et al. | 367/83 |
| 5,668,442 A * | 9/1997 | Goebel et al. | 315/39 |
| 5,689,218 A | 11/1997 | Stein et al. | |
| 5,825,485 A * | 10/1998 | Cohn et al. | 356/316 |
| 5,850,369 A * | 12/1998 | Rorden et al. | 367/83 |
| 5,994,984 A * | 11/1999 | Stancil et al. | 333/248 |
| 6,208,586 B1 | 3/2001 | Rorden et al. | 367/35 |
| 6,522,304 B2 * | 2/2003 | Ballantine et al. | 343/772 |
| 6,527,398 B1 * | 3/2003 | Fetzer | 356/437 |
| 6,633,236 B2 * | 10/2003 | Vinegar et al. | 340/854.4 |
| 6,662,875 B2 * | 12/2003 | Bass et al. | 166/369 |
| 6,683,574 B2 * | 1/2004 | Su | 343/700 MS |
| 6,781,477 B1 * | 8/2004 | Stancil | 333/125 |
| 6,868,040 B2 * | 3/2005 | Vinegar et al. | 367/82 |
| 6,871,081 B1 | 3/2005 | Llewellyn et al. | |
| 6,946,989 B2 * | 9/2005 | Vavik | 342/51 |
| 6,958,704 B2 * | 10/2005 | Vinegar et al. | 340/854.3 |
| 6,980,768 B2 | 12/2005 | Arend et al. | |
| 6,985,047 B2 * | 1/2006 | Brown et al. | 333/81 B |
| 7,050,765 B2 * | 5/2006 | Ammar et al. | 455/90.3 |
| 7,055,592 B2 * | 6/2006 | Bass et al. | 166/66.5 |
| 7,164,285 B1 | 1/2007 | Chao et al. | |
| 7,215,126 B2 * | 5/2007 | Furse et al. | 324/534 |
| 7,315,222 B2 | 1/2008 | Freeman | |
| 7,355,420 B2 * | 4/2008 | Smith et al. | 324/754 |
| 7,425,286 B2 * | 9/2008 | Ouchi | 264/1.24 |
| 2001/0026623 A1 * | 10/2001 | Erwin | 381/82 |
| 2002/0036085 A1 * | 3/2002 | Bass et al. | 166/250.01 |
| 2002/0121366 A1 * | 9/2002 | Bass et al. | 166/53 |
| 2002/0126021 A1 * | 9/2002 | Vinegar et al. | 340/854.3 |
| 2002/0160717 A1 * | 10/2002 | Persson et al. | 455/67.1 |
| 2003/0117322 A1 * | 6/2003 | Su | 343/700 MS |
| 2003/0179979 A1 * | 9/2003 | Ouchi | 385/14 |
| 2003/0188740 A1 * | 10/2003 | Tribelsky et al. | 128/200.14 |
| 2003/0216149 A1 * | 11/2003 | Edwards et al. | 455/550.1 |
| 2003/0227393 A1 * | 12/2003 | Vinegar et al. | 340/854.3 |
| 2004/0069984 A1 * | 4/2004 | Estes et al. | 257/25 |
| 2004/0079524 A1 * | 4/2004 | Bass et al. | 166/65.1 |
| 2004/0118348 A1 * | 6/2004 | Mills | 118/723 MW |
| 2004/0144530 A1 * | 7/2004 | Bass et al. | 166/65.1 |
| 2004/0263350 A1 * | 12/2004 | Vinegar et al. | 340/854.4 |
| 2005/0145018 A1 * | 7/2005 | Sabata et al. | 73/49.1 |
| 2005/0213436 A1 * | 9/2005 | Ono et al. | 369/13.02 |
| 2005/0264452 A1 * | 12/2005 | Fujishima et al. | 343/700 MS |
| 2006/0029326 A1 * | 2/2006 | Ouchi | 385/14 |
| 2006/0038168 A1 * | 2/2006 | Estes et al. | 257/25 |
| 2006/0071774 A1 * | 4/2006 | Brown et al. | 340/522 |
| 2006/0081565 A1 * | 4/2006 | Lee et al. | 219/121.43 |
| 2006/0087323 A1 * | 4/2006 | Furse et al. | 324/519 |
| 2006/0251115 A1 | 11/2006 | Haque et al. | |
| 2007/0004363 A1 * | 1/2007 | Kusaka et al. | 455/269 |
| 2007/0162536 A1 | 7/2007 | Ostrovsky et al. | |
| 2007/0171139 A1 * | 7/2007 | King et al. | 343/767 |

OTHER PUBLICATIONS

*Field Expressions and Patterns in Elliptical Waveguide*, Sen Li and Bai-Suo Wang, IEEE Transaction on Microwave Theory and Techniques, vol. 48, No. 5, May 2000.
*The Input Impedance of a Hollow-Probe-Fed, Semi-Infinite Rectangular Waveguide*, Rollins and Jaerm, IEEE Transactions on Microwave Theory and Technologies, vol. 37, No. 7, Jul. 1989.
*General Solution of a Monopole Loaded by a Dielectric Hemisphere for Efficient Computation*, K.W. Leung, IEEE Transactions on Antennas and Propagation, vol. 48, No. 8, Aug. 2000.
*Efficient Full-Wave Modal Analysis of Arbitrarily Shaped Waveguides using BI-RME and Nystrom Methods*, Taroncher, et al., 33rd European Microwave Conference, Munich 2003.

* cited by examiner

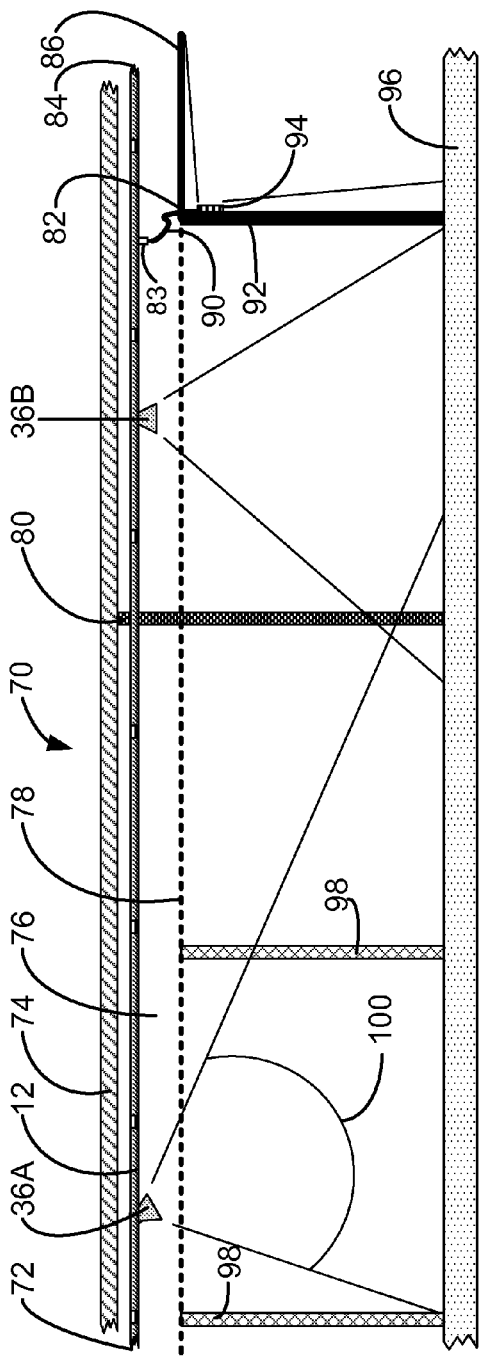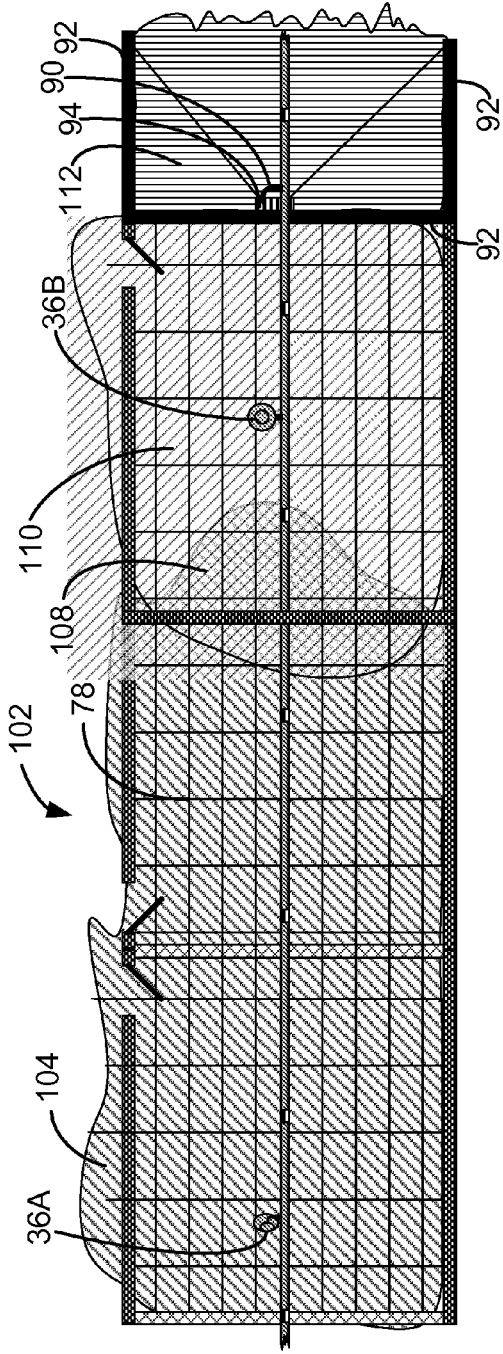

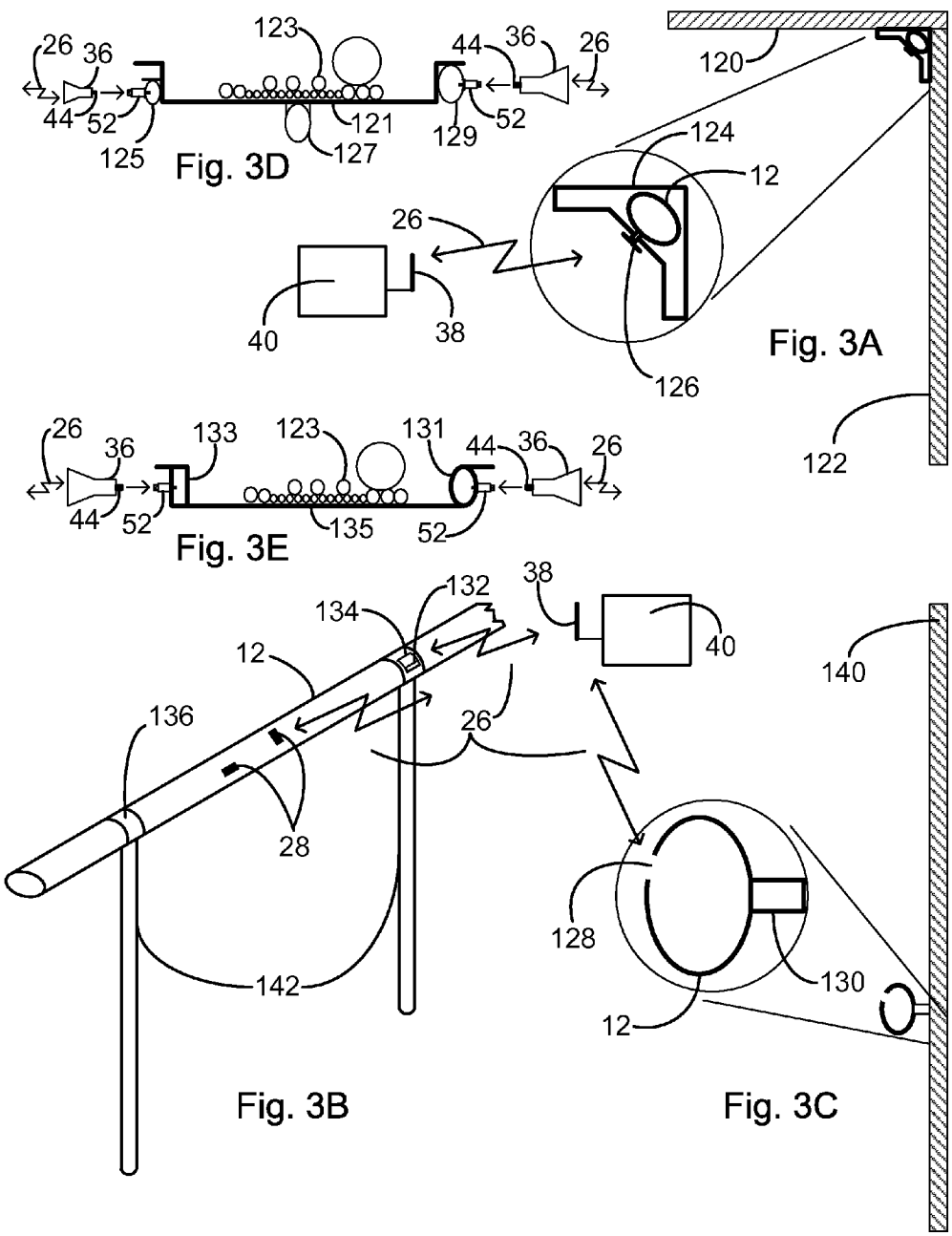

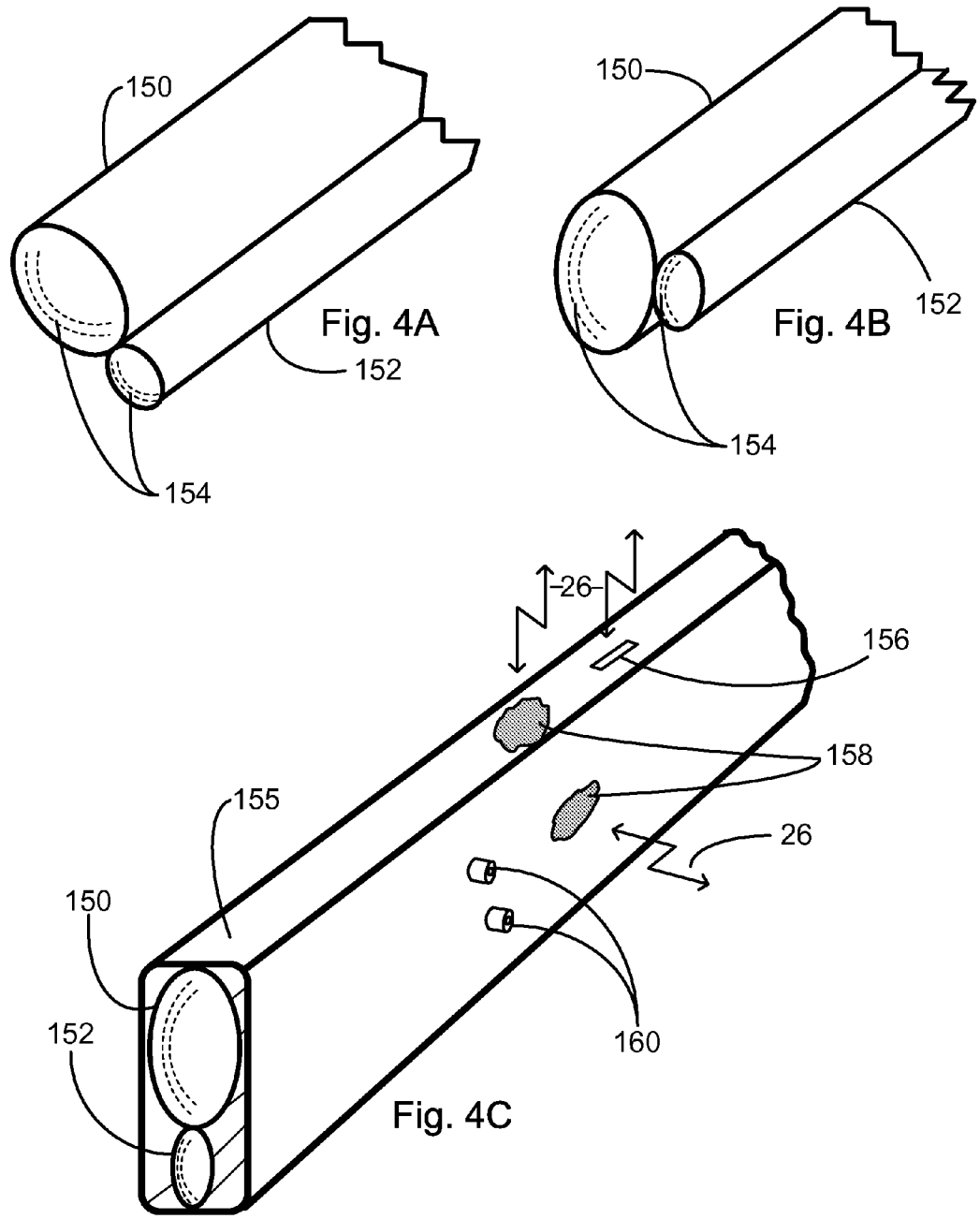

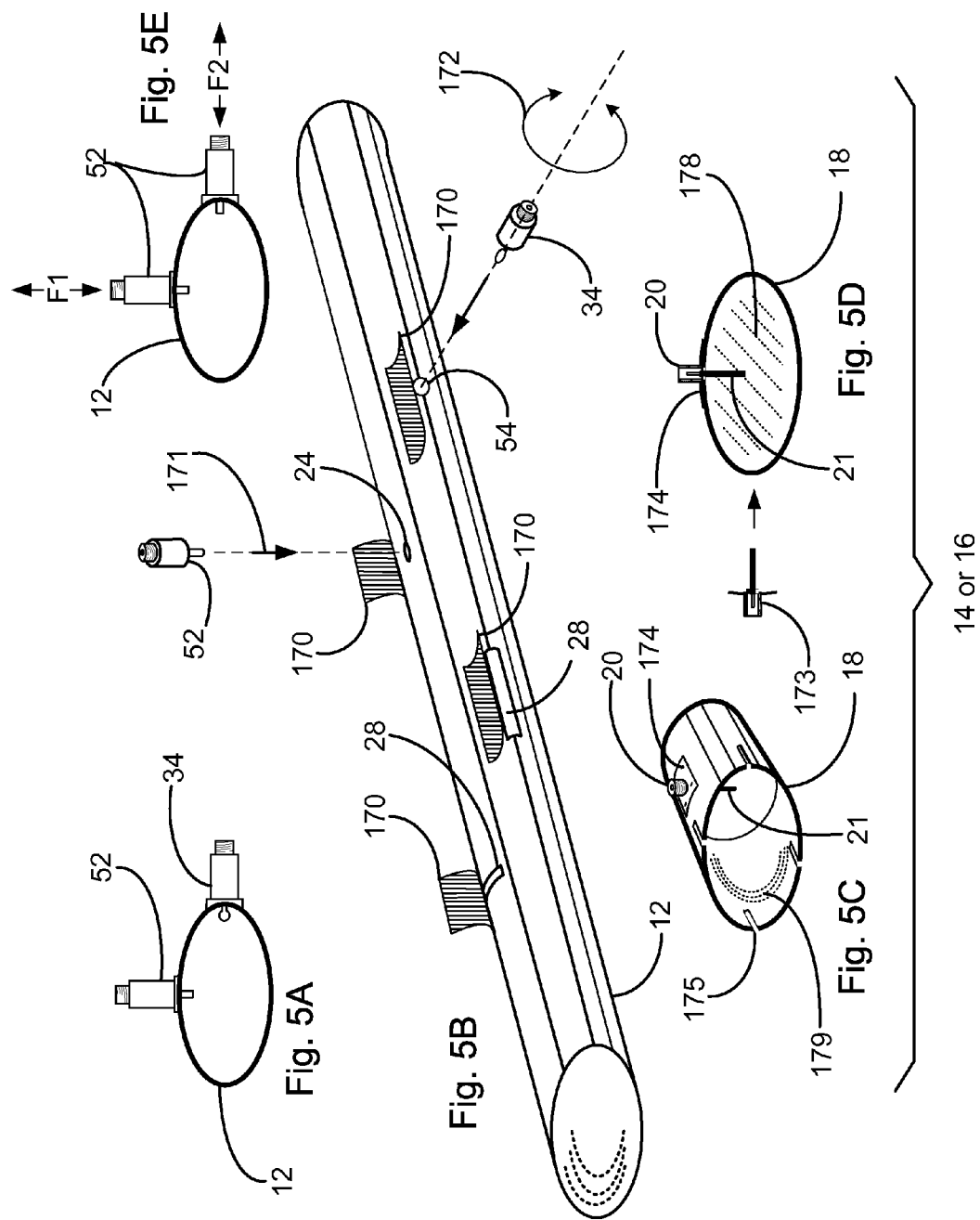

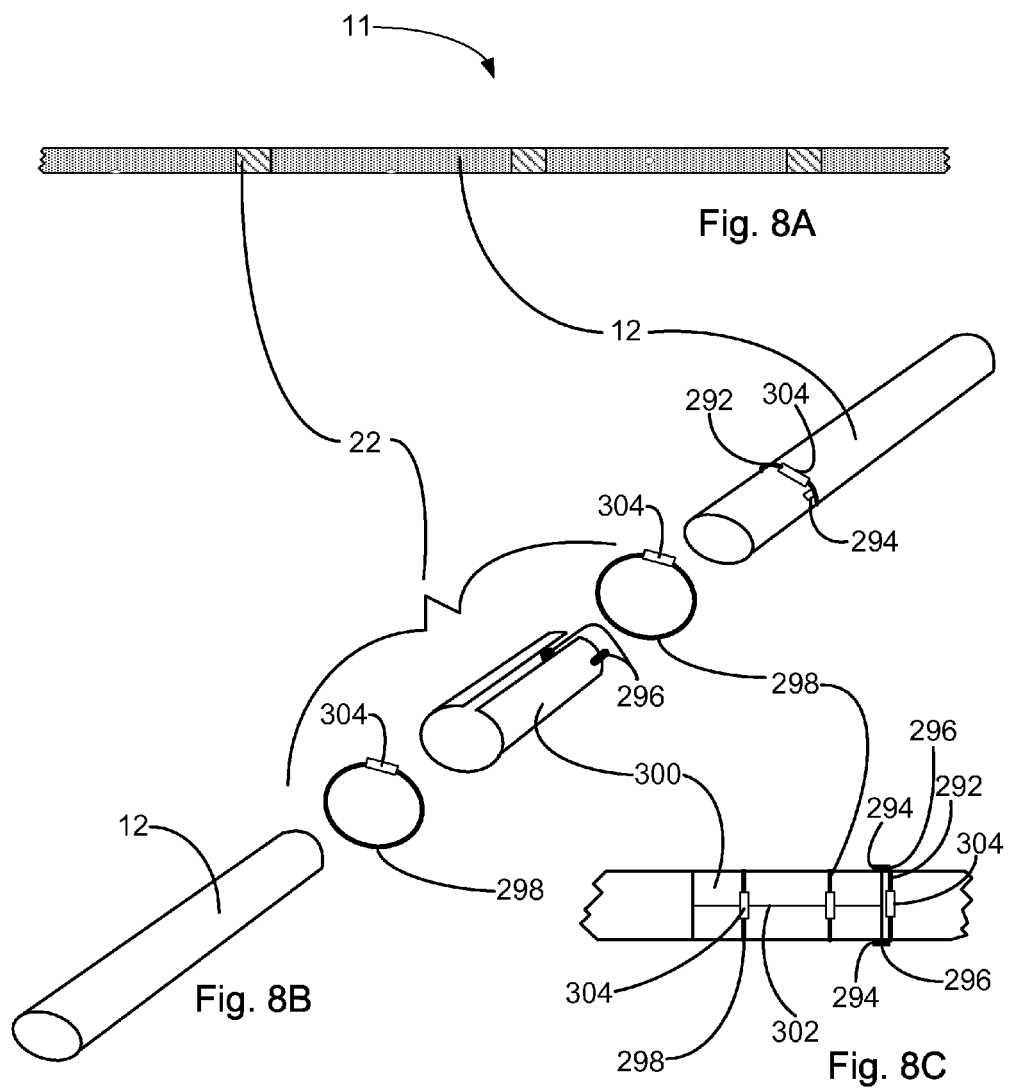

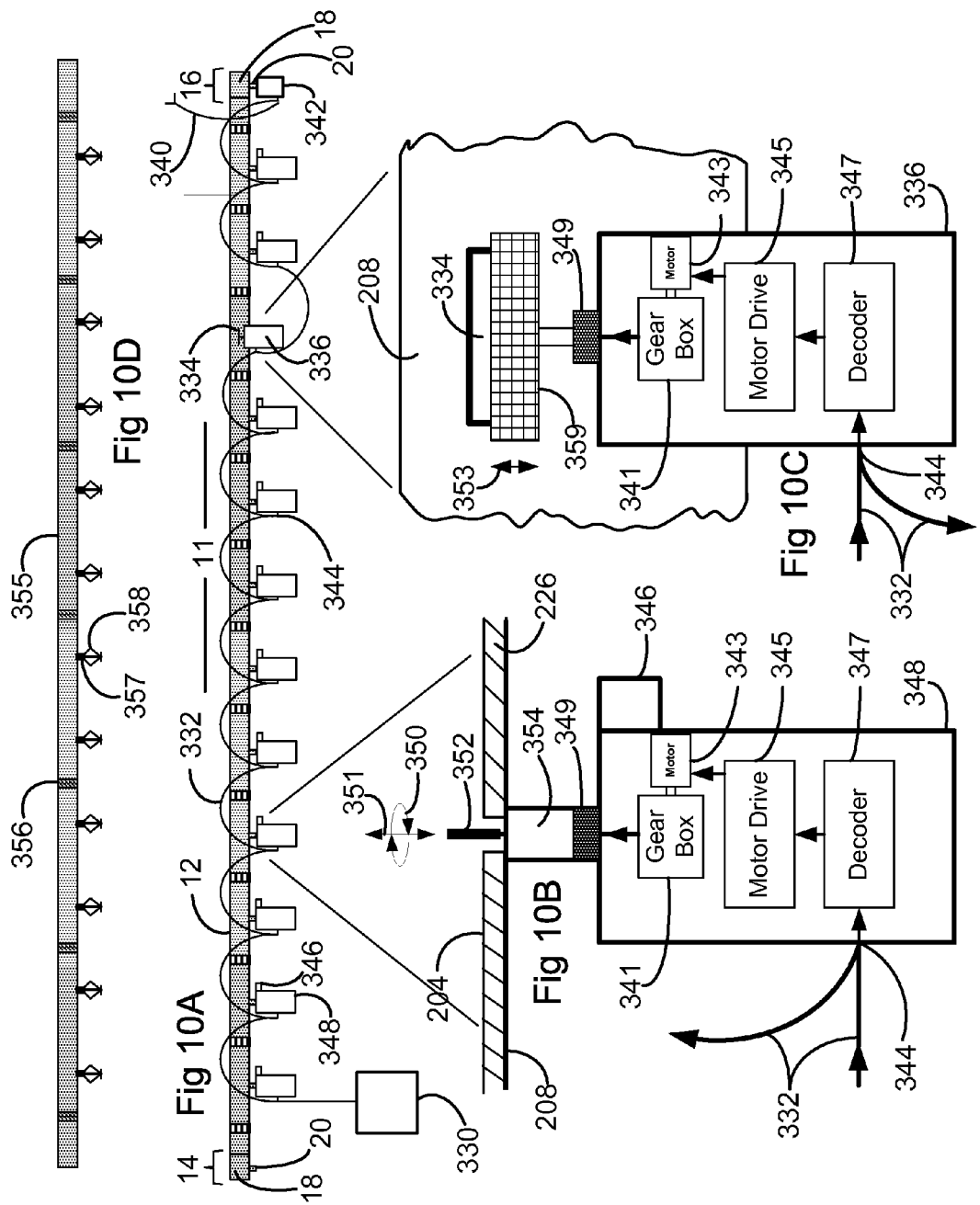

WAVEGUIDE-BASED WIRELESS DISTRIBUTION SYSTEM AND METHOD OF OPERATION

CROSS-REFERENCE TO RELATED PATENT APPLICATIONS

This patent application claims the benefit of U.S. Provisional Patent Application No. 60/718,419, entitled "Waveguide Wireless Distribution System," and filed Sep. 19, 2005.

FIELD

The present disclosure relates to wireless (radio) distribution systems, and more particularly to systems for distributing and gathering wireless signals in buildings, such as offices, factories, warehouses, schools, homes, and government facilities, and in open venues such as sports stadiums, parks, motorways and railways.

DESCRIPTION OF THE RELATED ART

This background information is provided in the context of a specific problem to which the disclosed subject matter in one or more of its aspects is applicable: the efficient distribution of wireless signals inside and outside offices or other buildings in which distances and structural impediments, or other objects, may otherwise diminish the strength and quality of wireless signals, and for the efficient distribution of wireless signals in open areas.

Portable communications units and other user devices, such as notebook computers, personal digital assistants, pagers, cell phones, portable audio and video receivers, and telemetry instrumentation that employ wireless communications at frequencies in the range of 1000 MHz and higher are now commonplace. The demand for readily available wireless communications services for these types of devices has increased significantly, along with the expectation by users that ubiquitous, reliable, wireless connectivity will be available to them within buildings and other indoor and outdoor venues that are frequented. The rapidly increasing use of both portable and fixed wireless-based communications devices requires more efficient and precise radio signal illumination of specific areas inside and outside building structures to fully utilize the government-limited radio frequency spectrum allocations that are presently available.

The deployment of increasingly higher speed data, voice, and video information encoded in digital and analog wireless signals is increasing demands on the design of antenna systems in buildings and other facilities where obstructions, distances, or regulations may limit the range of radio transmissions. This is particularly the case where government regulations and industry standards limit transmit power to low levels. There is also a concurrent need to limit transmit power from portable personal wireless devices to decrease drain on portable power sources, such as batteries, and also to reduce interference to nearby systems on the same channel.

Structure and object-induced multiple reflections of radio signals that concurrently arrive from two or more directions at a receiving antenna and can cause time distortion and fading of encoded data on radio frequencies that are presented to a receiver. High-strength and high-quality signals with minimal fading and arrival time distortion are required for reliable, low-cost, high-speed transmission and reception of radio-carried information. For example, wireless access point radios based on the current IEEE 802.11a/b/g standards typically use simple omnidirectional antennas, or antennas with moderate directivity, to cover an area in a building. A standard access point radio installation may employ one, or perhaps up to three, antennas that are placed on a wall at a single, specific, location in a building structure. It will then attempt to radiate signals as far as possible through, and around, the building's obstructions and contents to reach a user's wireless device. Receiver-based software processing of signals from multiple, co-located receiving antennas offers some improvement in signal quality, but obtains only moderately better recovery of a transmitted signal that has already suffered significant time delay spreading distortion, and amplitude distortion, in a reflecting, physically cluttered path taken by a signal.

It is becoming increasingly difficult to provide reliable communications to users of higher-speed wireless data, voice and video services when centralized antennas are employed due to amplitude attenuation and reflection delays suffered by wireless signals passing through walls, partitions, floors, stair wells, and other structures and objects typically found in buildings.

There is a continuing (and increasing) challenge to cover all required areas in a facility with sufficient and predictable signal strength and quality that will provide reliable communications in an environment of government regulations that limit the maximum output power of wireless transmitters. In particular, increasingly higher data rates in digital wireless systems, with their attendant higher levels of encoding, are demanding higher signal-to-noise ratios and higher signal quality to support full-speed, reliable operation.

Solving these wireless communications problems through improvements in wireless receiver sensitivity in the cited frequency range is increasingly challenging since receiver technology is close to reaching its theoretical limit of sensitivity in current system designs. The use of high-speed digital signal processors is somewhat improving data recovery, but at a price of higher power source drain, which causes lower battery life in portable systems, complex software, and increased cost. With restricted transmitter output power and limited receiver sensitivity, systems employing higher data rates and current system designs are restricted to a shorter operating range, thus requiring more radio transceivers to cover a given area, which incurs higher system costs and a greater risk of interference among radios in nearby areas that must share a common channel frequency.

In addition to IEEE 802.11a/b/g communications, other types of wireless systems that operate in the 2.4 GHz and higher frequency ranges, such as Bluetooth, ZigBee, and RFID systems need more efficient signal distribution systems. The standards for these technologies specify simpler encoding formats, lower data rates, lower transmit power, and lower receiver sensitivities in order to miniaturize components, reduce cost per function, and reduce overall device drain from a power source. Several of these factors combine to limit the communications range or economical deployment of these types of systems. Although limited range is desirable in some instances, most wireless systems suffer from limited coverage and/or the ability to cover desired areas with defined signal strength and quality.

Incompatibilities among different types of radio devices operating in the same frequency band are also a growing problem, especially when base unit antennas for each must be located in close proximity, and nearby radio transmitters that share the same spectrum are operated at an elevated transmit power to be able to obtain maximum communications range through structures and other objects.

One method that has been employed in an attempt to overcome attenuation and/or delay distortion caused by structural obstructions is to distribute signals in a portion of a facility using a "leaky" radiator. This type of radiator is usually in the form a special type of coaxial cable that employs holes or slots in its outer conductor that allow a controlled amount of radiation to "leak", i.e. radiate, throughout the cable's length. This type of leaky, linear radiator has a number of disadvantages at higher frequencies, however, due to the relatively high longitudinal signal attenuation inherent in a practical diameter of leaky coaxial cable. This characteristic quickly limits its useable longitudinal and orthogonal coverage distance, especially at microwave frequencies. Other disadvantages of leaky coaxial radiators include their lack of ability to vary their amount of coupling, i.e., leakage rate, along the length of the cable to compensate for linear loss in the cable, and their undesirable characteristic of radiating and receiving in a 360 degree zone orthogonal to the cable, and along its total length. Full radial radiation is disadvantageous in most applications since the intended user is typically located, for example, beneath the cable. Radiation upward from the cable, in this case, is wasted by absorption in the building's structure above, and also allows the possibility of intrusion from signals originating above the leaky line. Radiation from a leaky cable in unwanted areas over and under which the cable passes is also undesirable, wasteful of signal power, and difficult to avoid since it is difficult to implement a leaky cable system that will selectively apply signal to specific zones, and not others.

When used, a leaky coaxial cable radiator is usually installed in the space above a ceiling. Modern office buildings often use these spaces as a return plenum for circulated air from heating, ventilating and air conditioning (HVAC) systems. Most government-mandated federal fire codes impose stringent requirements on the composition of items installed in this type of environment to prevent the generation of noxious fumes that will recycle through an HVAC system into human-occupied areas during the occurrence of a fire in a plenum air space. As a result, coaxial cables, and any other types of signaling components designed for service in plenum spaces, must use special insulating materials in their construction, such as DuPont polytetrafluoroethylene ("Teflon®"), which causes radio frequency coaxial cables made from this type of material to be prohibitively expensive in many applications. Because of these restrictions, presently available technology does not offer practical, efficient, hidden wireless distribution systems that are designed for applications in HVAC plenum spaces, nor are present wireless distribution systems designed to be placed out of sight in plenum spaces.

The new technology and methods presented in the present disclosure address solutions to resolve these and other shortcomings of the present technology in the field.

SUMMARY

The techniques and concepts here disclosed provide wireless (radio) distribution systems, and more particularly high-efficiency waveguide-based systems for distributing and gathering wireless signals in buildings, such as offices, factories, warehouses, schools, homes, and government facilities, and in open venues such as sports stadiums, parks, motorways, and railways.

According to one aspect of the disclosed subject matter, there is provided a simplified, high-efficiency, waveguide-based wireless distribution system. The disclosed waveguide-based wireless distribution system transports wireless signals from a signal source to a location proximate to a signal receiver. The wireless waveguide includes a hollow cross-section structural construction. The hollow cross-section structural construction includes a conductive inner surface. At least one wireless communications signal coupling device partially inserts into the wireless waveguide at least one pre-determined aperture location along the wireless waveguide. Impedance matching circuitry connects the output of a coupling device to at least one connection point for at least one wireless signal radiator. Because of the disclosed system's structure and operation, many different configurations and implementations are possible.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages as may be included within this description be considered within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify various elements correspondingly appearing throughout this description and wherein:

FIG. 1 illustrates an embodiment of the waveguide-based wireless distribution system in accordance with aspects of the present disclosure;

FIGS. 2A and 2B respectively illustrate side and top views of an exemplary waveguide-based wireless distribution system antenna coverage plan for three offices and a radio-shielded work area;

FIGS. 3A through 3C illustrate alternate embodiments for installing waveguide sections in architectural features;

FIGS. 3D and 3E, respectively, illustrate embodiments of the subject waveguide system examples installed on, or integrated with, a carrier tray, as is commonly found in buildings for such purposes as the carriage of cables or pipes;

FIGS. 4A through 4C illustrate alternate embodiments for co-locating waveguide-based wireless distribution systems for two different communications schemes that operate in different frequency ranges (such as IEEE 802.11a and XM Radio);

FIGS. 5A and 5B illustrate alternate embodiments for coupling wireless signals into and out of a waveguide by using: (a) electric field coupling, (b) magnetic field coupling, and (c) slot radiator;

FIGS. 5C and 5D illustrate an exemplary embodiment of an end assembly for terminating the waveguide, including a coaxial-to-waveguide transition;

FIG. 5E shows a method of using two different, simultaneous transmission modes in the same waveguide;

Figure 9A:
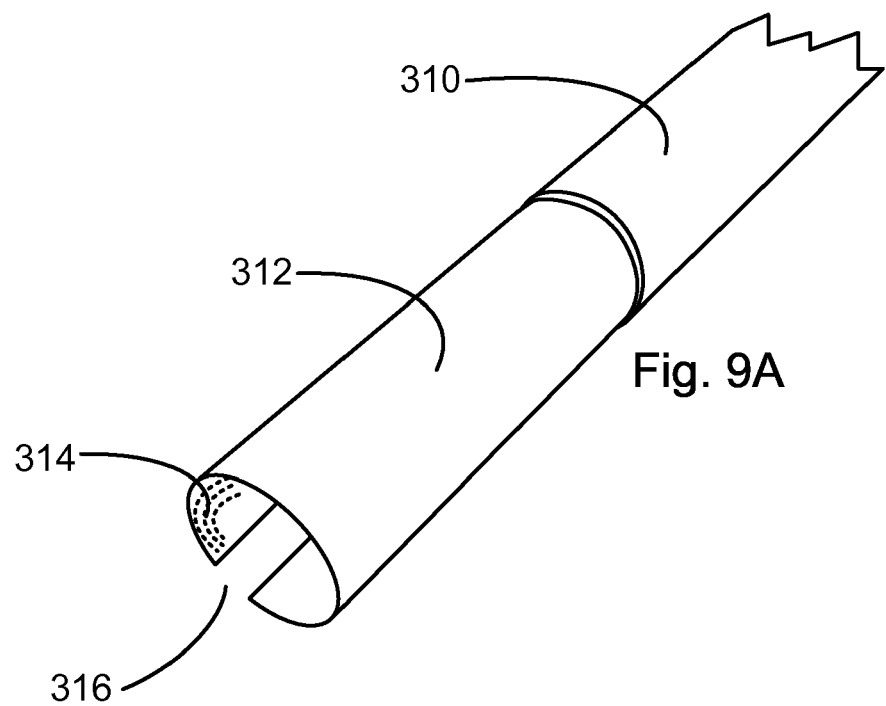
Figure 9B:
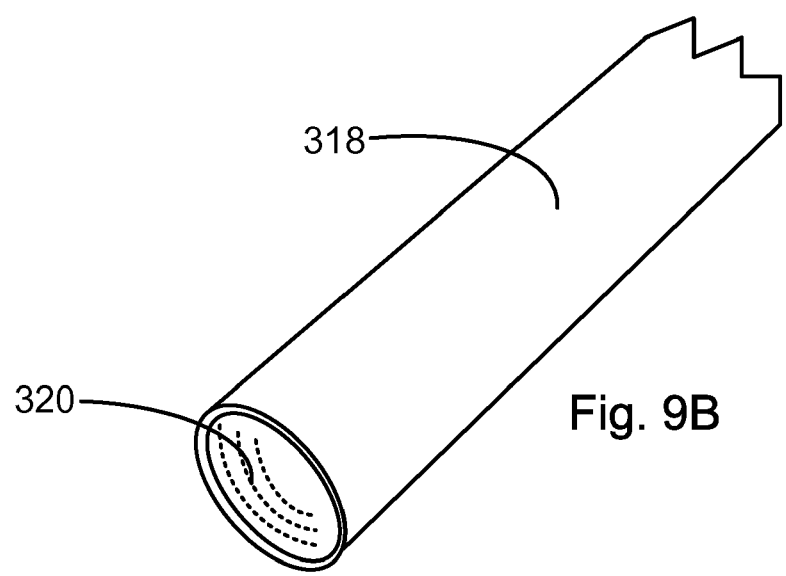
Figure 11:
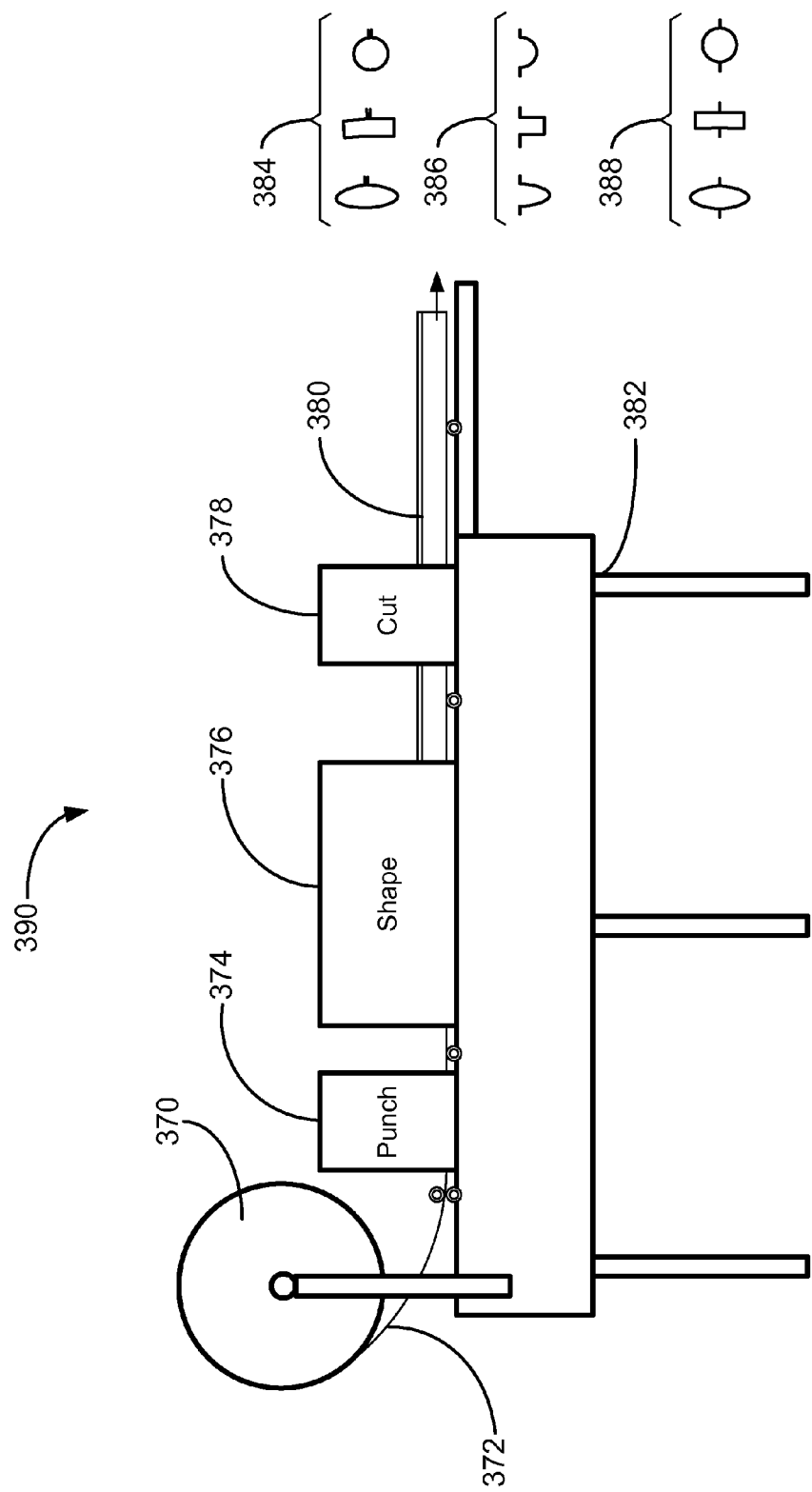
Figure 12:
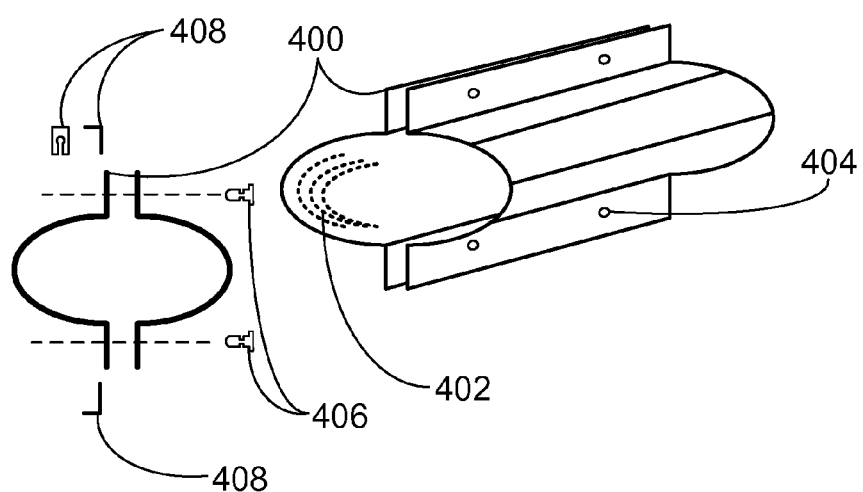
Figure 13:
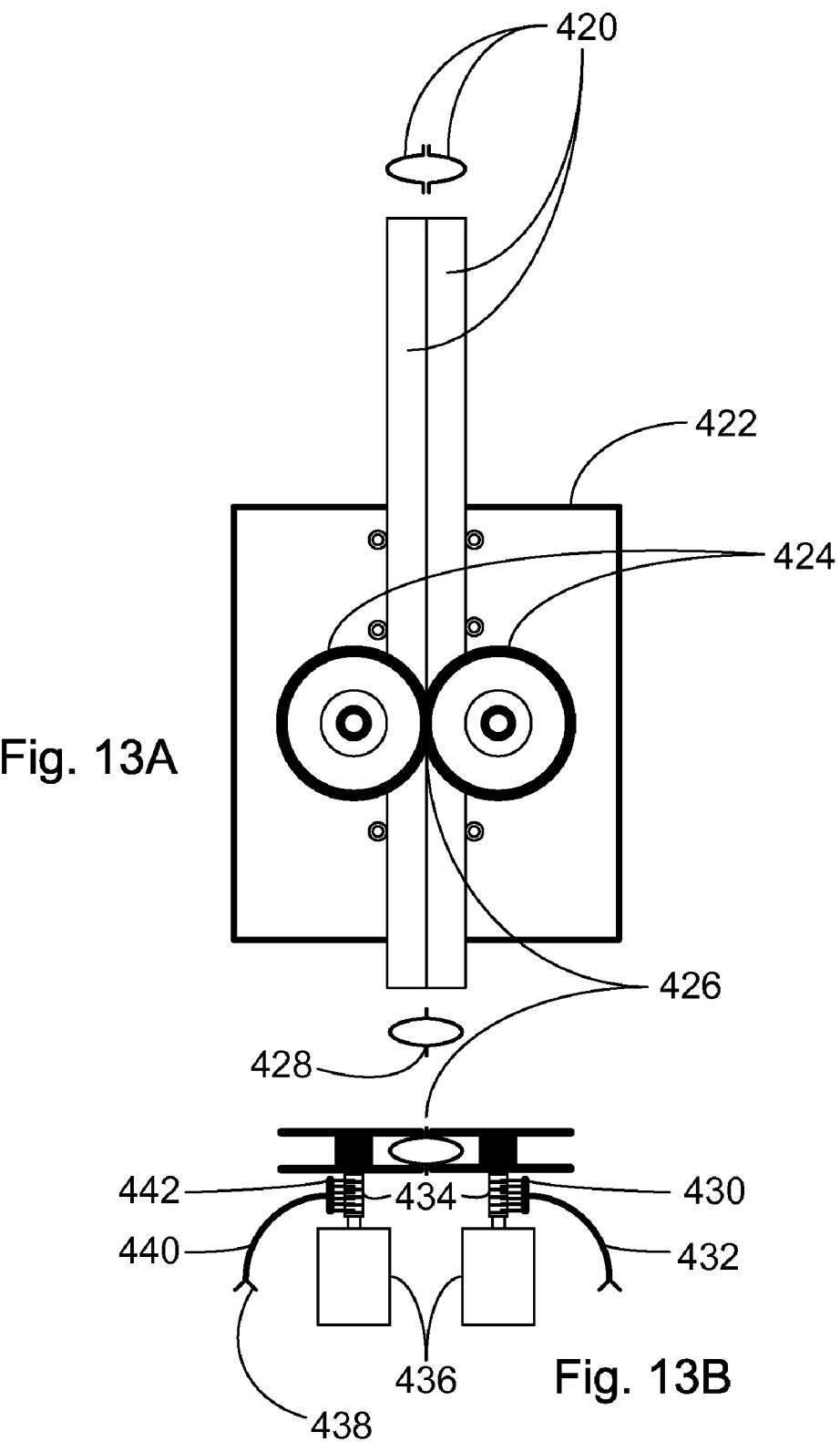
Figure 14:
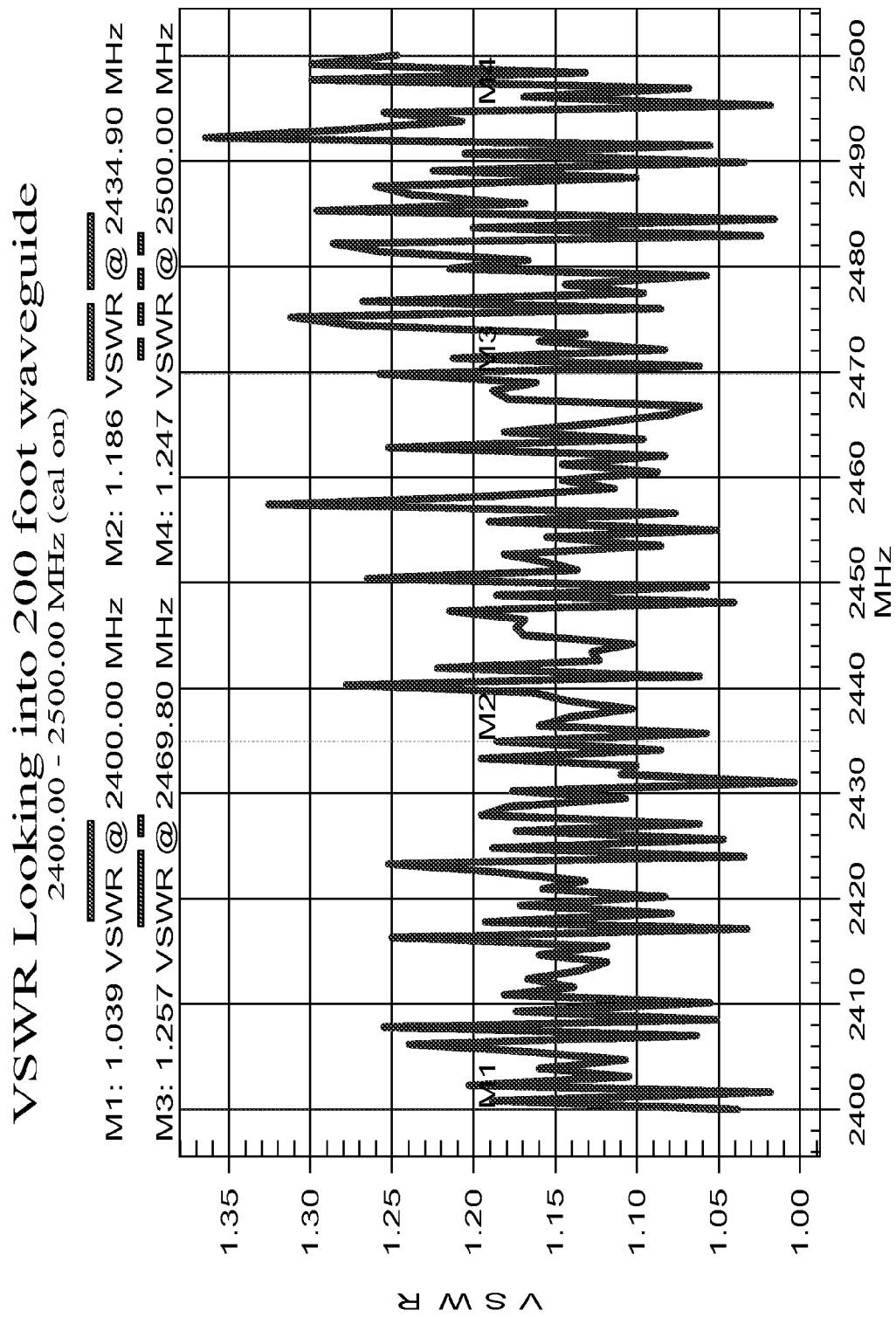
Figure 15:
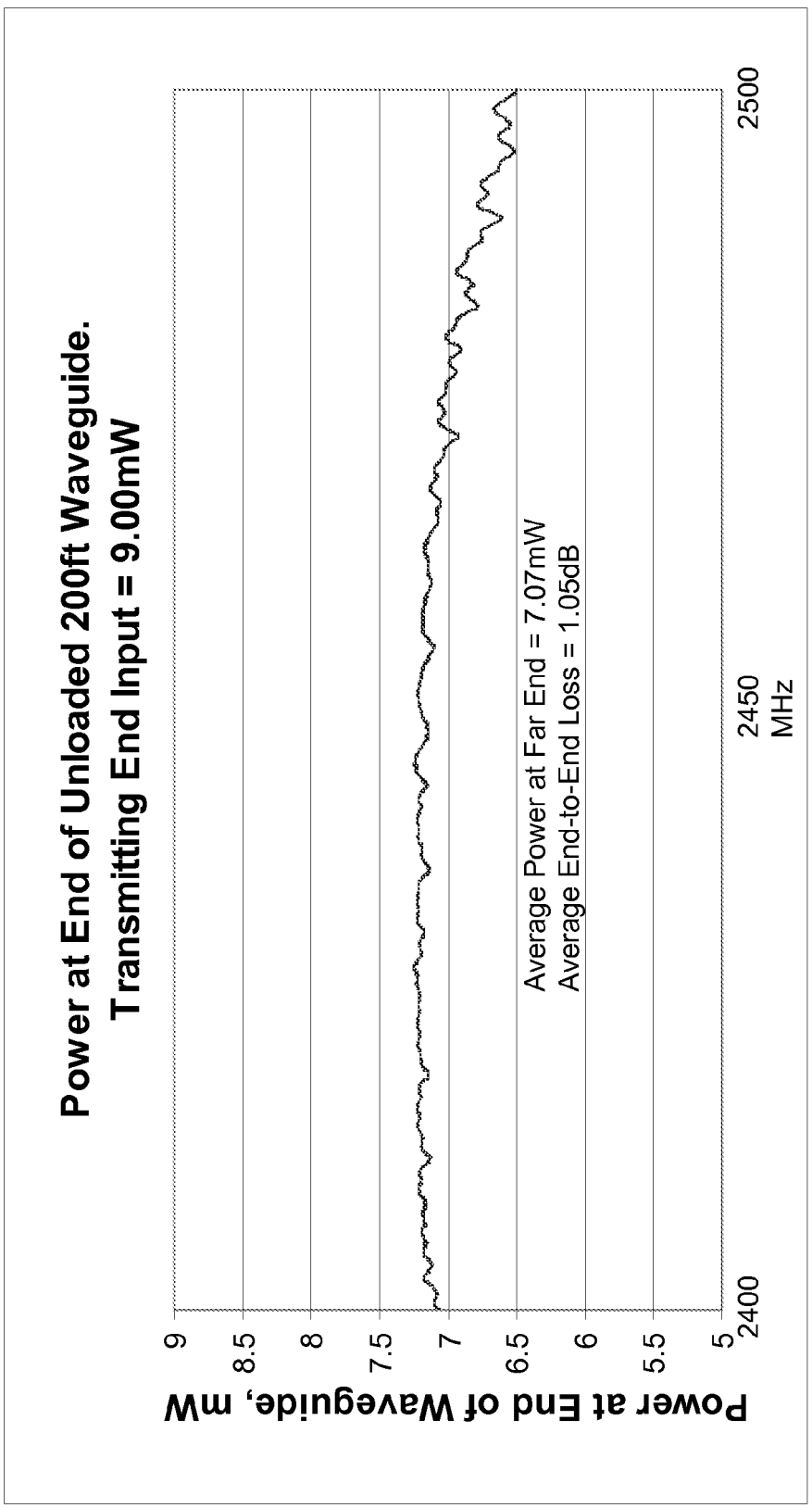
Figure 16:
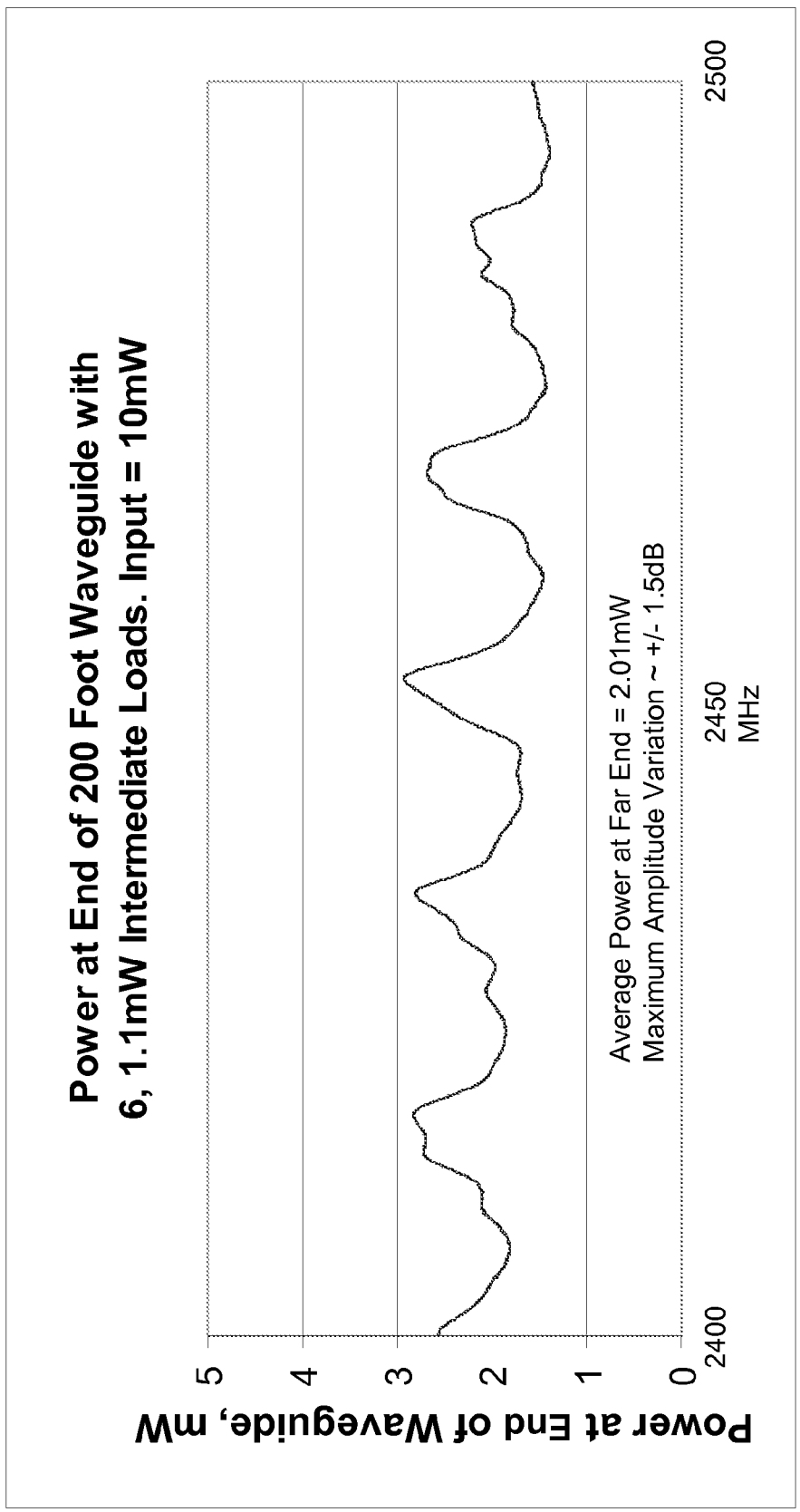

FIGS. 8A through 8C respectively illustrate assembled and exploded views of an exemplary embodiment for connecting waveguide sections;

FIGS. 9A and 9B respectively illustrate alternate embodiments for forming a waveguide using metalized foil inside a preset form, or utilizing an internally metalized pipe to form a useful waveguide;

FIGS. 10A through 10C respectively illustrate an exemplary waveguide system and associated motorized signal couplers for implementing an alternate embodiment of the waveguide system that is selectively configurable by means of remote control;

FIG. 10D illustrates the concept of a waveguide-based wireless distribution system here disclosed that is incorporated into, and combined with, the function of a fire extinguishing system, as may be found in commercial, industrial, private, and government buildings;

FIG. 11 illustrates an exemplary embodiment for forming waveguide sections from sheet metal or plastic sheet material;

FIG. 12 illustrates an exemplary embodiment that uses fasteners for assembling a waveguide by mechanically and electrically connecting two completed waveguide sections;

FIG. 13 illustrates an exemplary embodiment for assembling waveguide half sections using a continuous resistance welder to form continuous finished waveguide sections;

FIGS. 14 through 16 provide graphs of test data taken from an exemplary test system that demonstrates the results of using the disclosed subject matter.

DETAILED DESCRIPTION OF SPECIFIC EMBODIMENTS

The disclosed subject matter includes various embodiments of a waveguide-based wireless distribution system shown in the above-listed drawings, where like reference numerals designate like parts and assemblies throughout the several views. Reference to various embodiments does not limit the scope of the claimed subject matter.

The terms "wireless" and "radio" are used synonymously throughout the Detailed Description to generally refer to any form of wireless, i.e., radio signal communication at any applicable frequency, unless a specific communication scheme and/or frequency is indicated (such as IEEE 802.11b, Bluetooth, etc.).

Waveguide System

Figure 1:
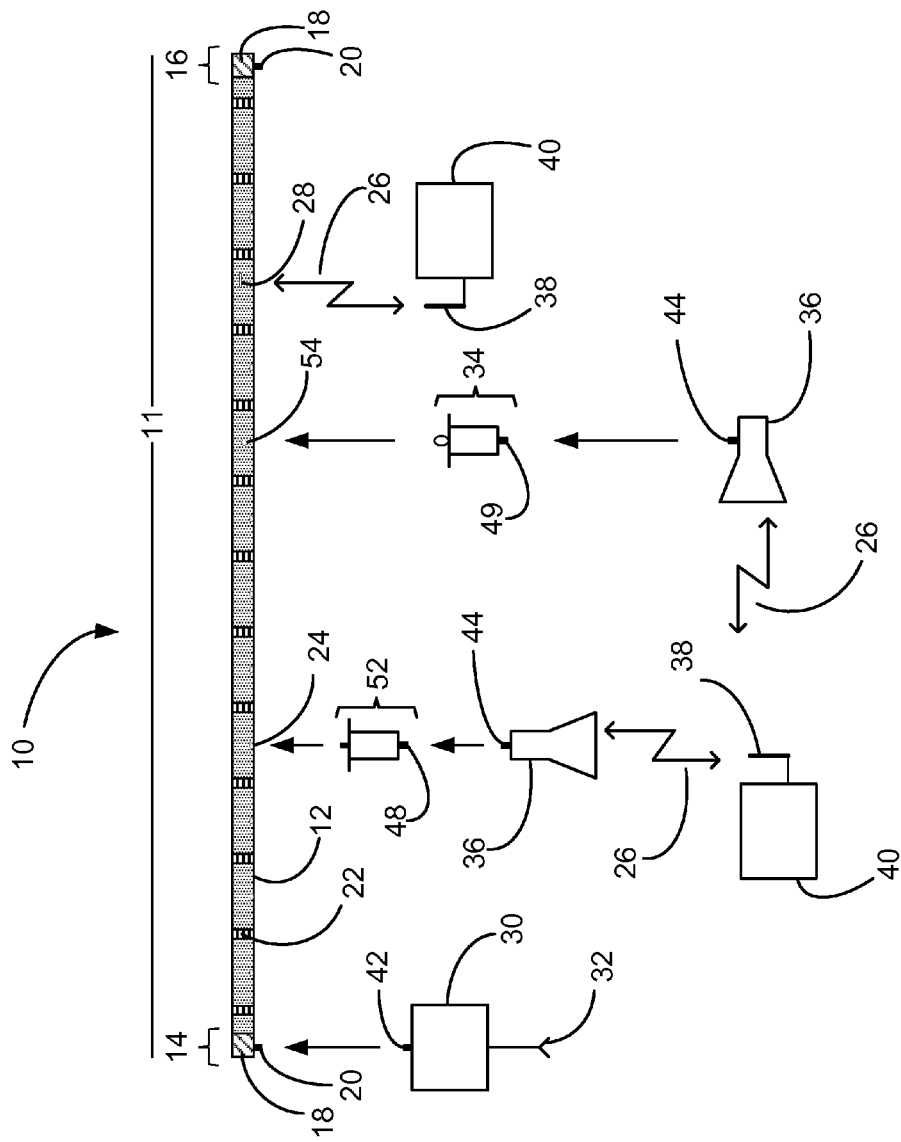

FIG. 1 illustrates an exemplary embodiment of a waveguide-based wireless distribution system 10 configured in accordance with aspects of the claimed subject matter in a predetermined bandpass frequency range. The waveguide-based wireless distribution system 10 comprises a waveguide 11, which is composed of one or more waveguide sections 12 with coupler apertures 24 and/or 54 and/or radiator slots 28, section connectors 22, end assemblies 14 and 16, and attached interface assembly 30, electric signal coupler 52, and/or magnetic signal coupler 34.

The present disclosure concentrates on the transmission of wireless signal energy from a signal source through the waveguide 11 to one or more magnetic signal couplers 34 and/or electric signal couplers 52 inserted into a waveguide section 12 or a waveguide section 12 may radiate signals from radiator slots 28. The output from one or more magnetic signal couplers 34 and/or electric signal couplers 52 attach through coaxial connectors 49 or 48 respectively to one or more antennas 36 which radiate signals through free space, to a client radio antenna 38 attached to a receiving device. It is understood that the waveguide-based wireless distribution system will operate bi-directionally, distributing wireless signals to, and receiving wireless signals from, one or more radio devices. Thus, for example, antennas connected to magnetic signal couplers 34 or electric signal couplers 52 attached to waveguide 11, or radiator slots 28 formed in waveguide 11 will operate bidirectionally for the transmission and reception of wireless signals.

Waveguide 11 is formed by mechanically and electrically connecting waveguide sections 12 together in tandem using section connector 22. One or more waveguide sections 12 may include pre-formed coupler apertures 24 and 54 adapted for attaching electric signal couplers 52 or magnetic signal couplers 34, respectively, and/or may contain radiator slots 28. Exemplary embodiments for coupling signals into and out of the waveguide 11 are described in connection with FIGS. 5A through 5E, 6, and 7. An exemplary section connector 22 for joining waveguide sections 12 is described in connection with FIGS. 8A through 8C.

Waveguide-based wireless distribution system 10 and waveguide 11 shown in FIG. 1 are configured for the injection/extraction of signal energy at waveguide end assembly 14 (designated the originating end), with the opposite end assembly 16 of waveguide 11 being terminated in an impedance equal to that of waveguide 11. In accordance with aspects of the disclosed subject matter, waveguide 11 is configured with predetermined load (antenna) attachment points along the waveguide that employ coupler devices and impedance transforming circuitry for the efficient coupling of wireless signals from waveguide 11. Alternate configurations include (a) configuring both waveguide end assemblies 14 and 16 with matched impedance terminations and configuring one or more intermediate waveguide sections 12 to employ signal injection/extraction, and (b) configuring both waveguide end assemblies 14 and 16 for signal injection/extraction using different frequencies and appropriate filters/combiners, with each end also being configured for matched impedance termination at the signal frequency injected from its opposite end.

A waveguide end assembly 14 is installed at the waveguide originating end and includes a coaxial connector 20. Wireless signals are presented to, or extracted from waveguide 11 such as by a signal interface assembly 30 connected from its coaxial connector 42 to coaxial connector 20 of the corresponding waveguide end assembly 14, which includes an appropriate quarter-wave radiator or other appropriate probe for excitation of the waveguide. For example, signal interface assembly 30 may be implemented as a transmitter, receiver, transceiver, filter, filters, combiner, duplexer, amplifier, amplifiers, or any combination of these, or any other passive or active radio frequency device adapted for connection of wireless signals into and/or out of a waveguide 11. Signal interface assembly 30 may be connected directly to coaxial connector 20 of end assembly 14, or may be connected by other means such as a suitable coaxial cable or any other type of suitable signal cable. Information intended for wireless distribution is coupled into the signal interface assembly 30 through an input port 32, which may have one, or more than one, signal paths.

Wireless signals presented to waveguide end assembly 14 are propagated through waveguide 11, and are coupled to electric or magnetic probes that are part of electric signal couplers 52 or magnetic signal couplers 34, respectively. Electric signal couplers 52 or magnetic signal couplers 34 are attached and inserted at selected coupler apertures 24 or 54 respectively along the length of waveguide 11. The output of either type of coupler is in turn connected through impedance matching circuitry to an antenna on its output coaxial connector 48 or 49, respectively, either directly, or through an intermediary transmission line. Signals in waveguide 11 may also be transmitted directly to free space through example radiator slots 28. As described further in connection with FIGS. 5A and 5B, for a preferred embodiment, at least some of waveguide sections 12 include pre-formed coupler apertures 24 and 54 or radiator slots 28. These pre-formed apertures are initially covered (such as by a conductive adhesive tape) to maintain the signal integrity of the waveguide 11 if no coupler or slot is employed at an aperture location along the waveguide. The selected coupler apertures 24 or 54 and/or radiator slot 28 are uncovered at selected locations of waveguide sections 12 during configuration or installation of the system to enable signal extraction/radiation at locations along waveguide 11. Signals 26 radiated by antenna/coupler combinations 36A and 36B, and/or radiator slots 28, are received and decoded by radio 40.

As described in further connection with FIGS. 5A through 5E and FIGS. 6 and 7, magnetic signal couplers 34 and electric signal couplers 52 are placed at selected locations along the waveguide and are used primarily for the purposes of providing a method of coupling a predetermined amount of energy from waveguide 11, through the use of adjustable signal probes. Matching circuitry between the probe impedance of a coupler and the antenna impedance (typically 50 ohms) is also provided.

All methods of coupling electromagnetic signals 26 into, and out of, waveguide 11 are adjustable in the amplitude of signals transmitted to radios 40, through attached client radio antenna 38, which is located in the reception zone of any of antennas 36, or radiator slots 28.

The specific implementation of a waveguide-based wireless distribution system 10 according to the matter herein claimed, including an associated antenna/signal coverage plan, is a design choice based on the teachings of the Detailed Description and known waveguide design principles. The principal design considerations are: (a) waveguide configuration (such as cross section and its interior electrical conductivity), (b) antenna selection/design, (c) antenna placement, and (d) signal coupling coefficients (i.e., signal energy extracted from the waveguide). These design considerations represent interrelated design trade-offs understood by those skilled in the art.

As described further in connection with FIGS. 5A and 5B, the preferred cross sectional configuration for waveguide 11 is hollow with an elliptical cross section that contains a highly conductive, smooth, inner surface. This cross-sectional configuration is a design choice. Rectangular or circular cross-section shapes, for example, are commonly used for waveguide and are applicable, as are any longitudinal shapes of consistent cross section and dimensions that will support waveguide propagation at the frequencies of interest. Design considerations for waveguide section 12 include frequency bandpass, propagation efficiency, physical robustness, installation restraints/requirements, and possible architectural/aesthetic considerations.

FIGS. 2A and 2B, respectively, illustrate an exemplary antenna/signal coverage plan in the context of three offices 102 and a radio-shielded area 112, in which roof/floor structural element 74 is a roof or above-ground floor, and structural element 96 is a ground floor. Waveguide 11 (of a selected cross section) is routed through air space 76 bounded by drop ceiling 78 and roof/floor structural element 74, and is shown entering the area at overhead location 72 and exiting the area at overhead location 84. The waveguide system may extend beyond overhead locations 72 or 84 in either or both directions, ultimately terminating in end assemblies 14 and 16 such as shown in FIG. 1.

The volume of air space 76 above drop ceiling 78 is a plenum space, which is typically used for return air in heating, ventilation and air conditioning (HVAC) systems. It is often subject to restrictions on the types of materials which may be placed in this type of area due to toxicity of certain gases that may evolve from smoldering or flammable substances which may be harmful to human occupants of the building during the occurrence of a fire or overheated wiring in the plenum space. Embodiments of the waveguide-based distribution system 10 of the present disclosure are adaptable for compliance with the requirements of fire and safety regulations as they pertain to HVAC plenum spaces. All of the waveguide 11 may be constructed with metal, except for the insulators used in coaxial connectors 20 and electric signal couplers 52 and magnetic signal couplers 34, all of which may be constructed using very small volumes of plenum-rated insulating materials.

Waveguide 11 may be routed through existing walls or other structural elements, such as firewall 80. Alternately, waveguide 11 may be terminated on one side of a wall (such as in a termination end assembly 16 shown in FIG. 1), and then connected to a suitable coaxial cable, which may be plenum rated, if necessary, which is routed through the wall, and subsequently connected to an originating end assembly 14 of another waveguide section on the other side of the wall.

For a given waveguide installation, the antenna/signal coverage plan is determined by routine design trade-offs based on antenna gains and patterns, placement of antennas, and signal coupler coupling coefficients. All of these factors combine to provide the desired signal levels in designated user areas. The antenna/signal coverage plan illustrated in FIGS. 2A and 2B provides a signal distribution profile (floor illumination shown in FIG. 2B) with signal zone 104 and signal zone 110 (including overlapping signal zone 108) for the three offices, and separate signal zone coverage in the radio-shielded area 112.

Thus, the three offices are covered by antenna/coupler combination 36A and antenna/coupler combination 36B, with antenna/coupler combination 36A being oriented to provide primary coverage for two rooms, resulting in full coverage of the three rooms with the overlapping signal zone 108. Antenna/coupler combination 36A and antenna/coupler combination 36B employ signal couplers, such as magnetic signal coupler 34 and electric signal coupler 52 shown in FIG. 1 which are discussed in greater detail in connection with FIGS. 5A through 5D and FIGS. 6 and 7. They couple signal energy from the waveguide 11 based on the required signal coupling coefficient for each area.

Antenna/coupler combination 36A and antenna/coupler combination 36B radiate at a preselected signal level set by each signal coupling coefficient and the antenna design, illuminating respective signal zone 104 and signal zone 110 through drop ceiling 78, which neither absorbs nor reflects significant amounts of microwave energy.

Radio-shielded area 112, defined by metal-covered walls 92 and metal-covered ceiling 86, represents shielded radio frequency obstructions that are often encountered in structures that contain, for example, walk-in coolers in food storage areas, radiology rooms in medical facilities, and sections of buildings that use metal siding and metal panels in wall construction. An exemplary embodiment for covering this type of radio-shielded area 112 uses a coaxial cable 90 connected to a magnetic signal coupler 34 or electric signal coupler 52, and routed through an opening 82 in metal ceiling 86, and then connected to an antenna 94 which illuminates the radio-shielded area.

Antenna/coupler combination 36A and antenna/coupler combination 36B may be any radiating and coupling devices that will satisfy the design considerations for signal strength and the three dimensional signal zone coverage pattern needed to illuminate a designated area, and which may need to comply with building codes, regulations, environmental constraints, and aesthetics imposed by the owners of each office, school, government facility, factory, warehouse, residence, or other structure in which they are installed.

As an alternative to the antenna/coupler configurations illustrated as antenna/coupler combination 36A and antenna/coupler combination 36B, a radiating slot (such as radiator slot 28 illustrated in FIG. 1), which acts as an antenna, may be used, for example, in applications where the less-focused radiated pattern from a slot radiator is sufficient to cover the intended area. The amount of signal coupled out of the waveguide may be varied by adjusting the effective dimensions of a pre-installed slot as described, for example, in slot 132 and dual purpose fastener 134 in FIG. 3B.

Internal building walls 98 are seen to be relatively transparent to radiation from antenna/coupler combination 36A and antenna/coupler combination 36B and allow penetration of signals that are essentially orthogonally incident on these walls. This effect is due to building construction being composed of wood or metal studs, in typical walls, which are covered by dry wall (sheet rock) materials which, when approached at a right angle in one dimension, as depicted, allow passage of microwave energy with low to moderate resulting signal attenuation or reflection. Two or more rooms in a structure may be illuminated by microwave signals by using this method in applying the technology in this instant disclosure.

The depicted method of illuminating signal zones using overhead radiators in structures eliminates the many attendant problems experienced by current single-point radio installations which rely on one, or even several, co-located receiving antennas to attempt to recover radio signals that have suffered extensive signal degradation due to absorption and multipath reflections from metal studs, furniture, machinery, people (both still, and in motion) and equipment inside typical facilities. The waveguide-based wireless distribution system 10 of the present disclosure allows application of a selectable, preset, signal strength in each designated signal zone and offers the additional advantage of low degradation of signal quality due to reduced envelope delay distortion caused by multiple reflections. The system also allows greatly expanded areas of coverage, with signals of improved signal strength, consistency, quality, and data rate guarantees for client radio devices in the areas serviced. Excessive signals that may cause interference to other receivers outside an intended area are also greatly reduced and allow coexistence of such nearby services, for example, as IEEE 802.11b/g with Bluetooth or ZigBee.

FIGS. 3A and 3B respectively illustrate alternate embodiments for integrating waveguide 11 into architectural structures according to aspects of the present disclosure. FIG. 3A shows horizontal surface 120 and vertical surface 122 depicting a typical meeting of architectural surfaces in a building. Waveguide 11 is enclosed in an example aesthetic covering trim 124 placed in the intersection of these surfaces. Antenna 126, illustrated here as a dipole antenna, may be coupled to waveguide 11 via an electric signal coupler 52 or magnetic signal couplers 34, and may be used to radiate signal 26 to client radio antenna 38 of radio 40. A waveguide radiator method may also be comprised analogously of radiator slot 28, in which case any material covering waveguide 11 must be transparent, or nearly so, to microwave energy FIG. 3B depicts waveguide section 12 configured as a hand railing, attached to vertical support posts 142 by dual-purpose fasteners 134 and 136. Radiator slots 28 are shown in two of many possible positions. Since radiator slots 28 will necessarily penetrate the wall of the waveguide (handrail), they may be covered with an overlay material, such as plastic, which will seal the waveguide from intrusion of moisture and detrimental objects. The covering material is required to have low attenuation to signals exiting the waveguide. The size of the slots may be either fixed in dimensions, or field adjustable to accommodate variation in the amount and direction of the signal level radiating from the waveguide at that position. Dual-purpose fastener 134 is an alternate method of mechanically fastening waveguide 11 to vertical support posts 142 and incorporates dual-purpose fastener 134, which is used to fasten the hollow metallic waveguide to the vertical support post 142 and to adjust the amount of radiation from waveguide section 12 by varying one or more dimensions of slot 132.

FIG. 3C is a variant of FIG. 3B and illustrates waveguide 11 used as a hand rail mounted on wall 140, with radiator slot 128 and wall mounting bracket 130. Radiation from slots 28, 128, and 132 all communicate with radio 40 via signals 26 to client radio antenna 38. Elements of each design may be exchanged between 3B and 3C for particular applications.

FIGS. 3D and 3E illustrate embodiments of the waveguide-based wireless distribution system adapted for installation with, or integration in, a carrier tray typically found in overhead spaces in offices and industrial sites. Tray 121 supports cables, pipes or ducts 123. Referring to FIG. 3D, exemplary waveguides 125, 127, and 129 are attached to tray 121. By combining the cables/pipes/ducts onto tray 121 with one or more waveguide elements, the composite structure allows a simpler, multi-function installation in which cables, pipes or ducts may be installed along with a waveguide to be used as part of a waveguide-based wireless distribution system according to aspects of the disclosed subject matter.

Antennas 36 are coupled via electric signal couplers 52 or magnetic signal couplers 34 to waveguides 125, 127 and 129 at preselected locations along the waveguide for extraction/coupling of energy from waveguides 125, 127 and 129 which may be of any cross-sectional shape that will support waveguide propagation. For each antenna 36, the example electric signal coupler 52 or magnetic signal coupler 34 connects to antenna connector 44, coupling a predetermined amount of signal energy from an aforementioned waveguide to the antenna 36 to be radiated according to the chosen antenna/signal coverage plan. Slot radiators in waveguides 125, 127 and 129 may also be used to radiate a predetermined amount of radio frequency energy.

FIG. 3E illustrates a carrier tray 135 that includes one or more example waveguide elements 131 and 133 integrated with (manufactured as part of) the tray structure. Waveguide elements 131 and 133, which may be of any cross-sectional shape that will support waveguide propagation. As in FIG. 3D, electric signal couplers 52 or magnetic signal couplers 34 in FIG. 3E may be used for the efficient extraction of energy from waveguide elements 131 and/or 133 that are part of carrier tray 135, for radiation by antennas 36. Alternatively, slot radiators may be used in place of electric signal couplers 52 and antennas 36 or magnetic signal couplers 34 and antennas 36.

FIGS. 4A, 4B and 4C illustrate alternate embodiments for combining separate waveguide distribution systems for two or more different communications schemes operating in different bands of frequencies, such as IEEE 802.11a and XM Radio. FIGS. 4A and 4B show cross sections of waveguide 150 and relatively smaller waveguide 152 which operate at different bandpass frequencies when used in their fundamental operating modes. Many groups of frequencies may be accommodated by using this scheme and by combining applicable frequency groups in each waveguide using RF combiner/duplexer technology. Waveguides 150 and 152 may be manufactured together in one process, such as by metal or plastic extrusion, or may be made separately, and then mechanically attached together. The inner surfaces 154 of waveguides 150 and 152 are composed of a smooth, highly conductive surface, such as copper, silver, aluminum, or gold.

FIG. 4C illustrates an exemplary method of encasing two waveguides 150 and 152 in a common enclosure 155. Waveguide connection ports 160 for connection to external antennas may be brought out from signal couplers (not shown) attached to the waveguides 150 and 152. Alternatively, common enclosure 155 may be oriented to permit slots to radiate through its wall, which would, in this case, be made of a material that does not significantly inhibit the passage of microwave energy, such as a suitable plastic or ceramic material. As another alternative, radiator slots 156 or 158 may be openings in a metallic version of common enclosure 155 located adjacent to an inner radiating slot (not shown) in, for example, waveguide 150, and made sufficiently large to not significantly distort the characteristics of the radiated field pattern of the inner slot radiator.

Figure 6:
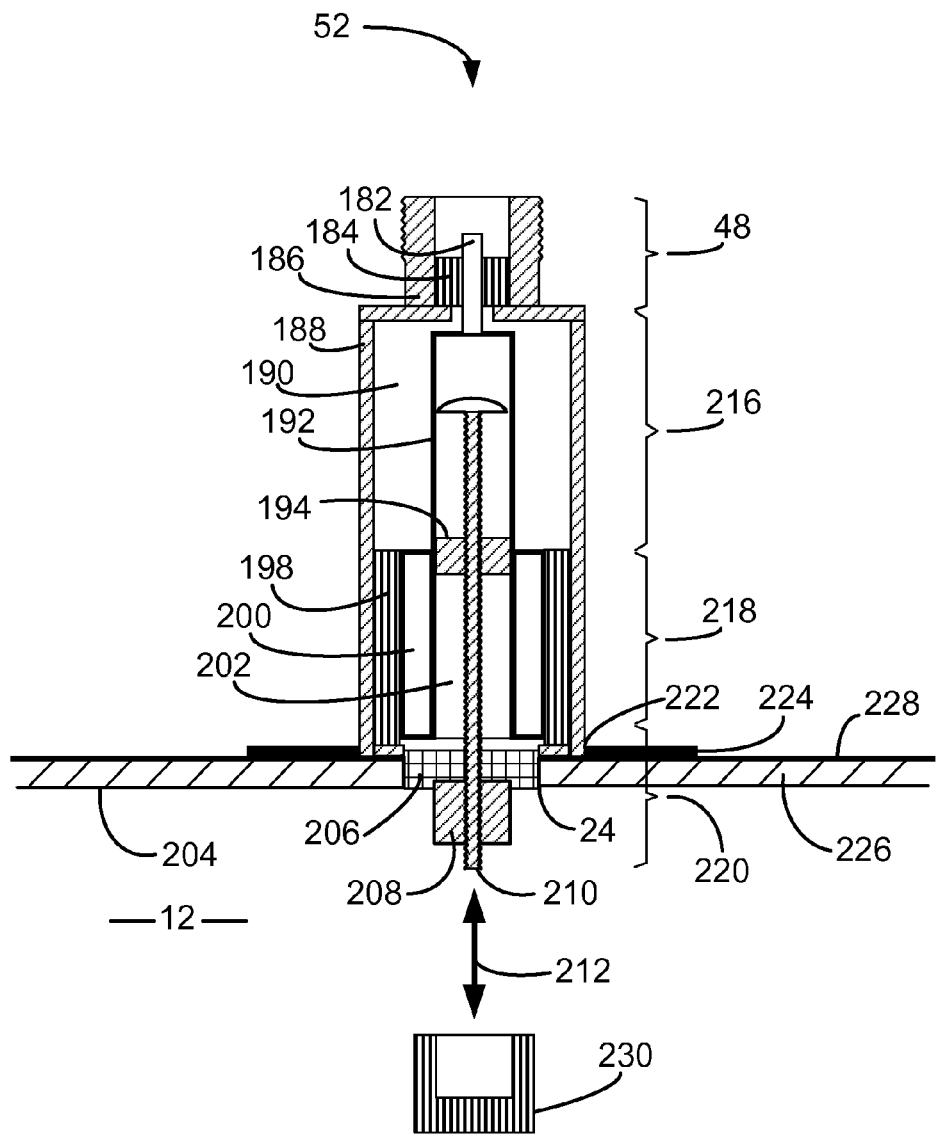
FIG. 6 illustrates an exemplary electric field signal coupler for coupling wireless signals out of a waveguide.
Figure 7:
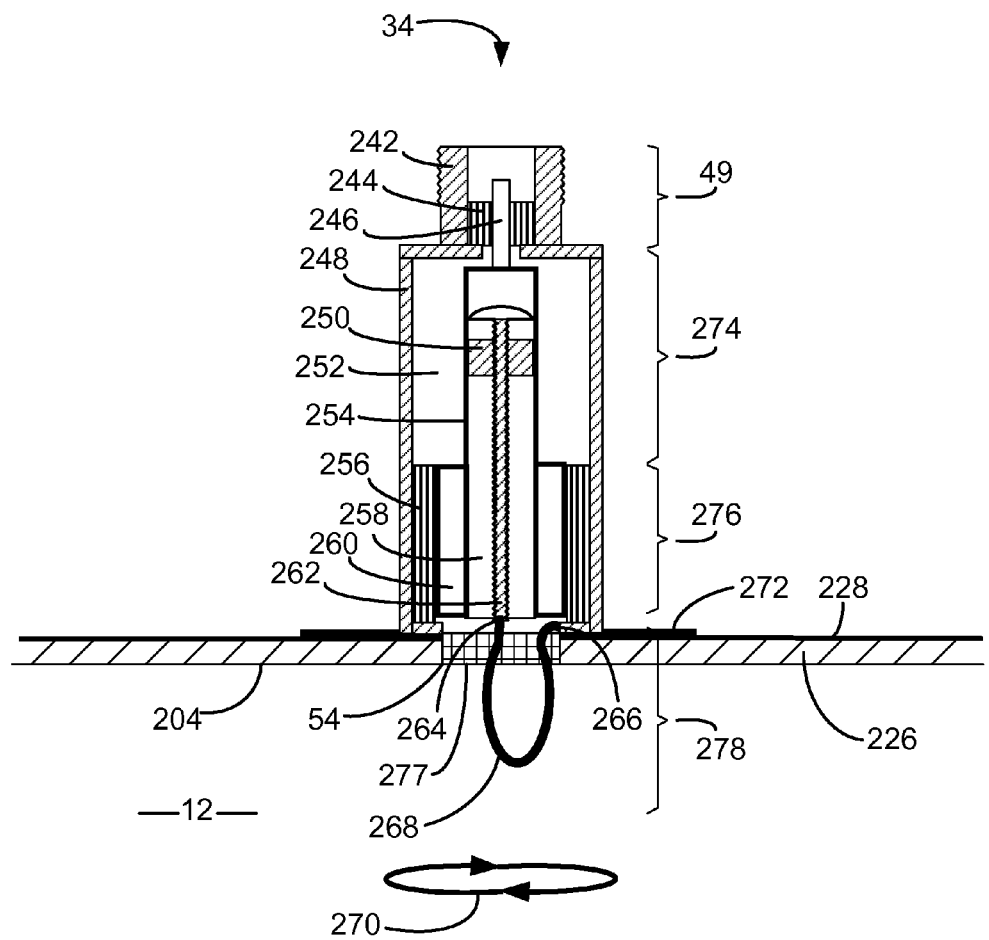
FIG. 7 illustrates an exemplary magnetic field signal coupler for coupling wireless signals out of a waveguide.

Waveguide and Signal Extraction FIGS. 5A through 5E illustrate exemplary embodiments for coupling signal energy out of waveguide section 12 using magnetic and electric signal couplers 34 and 52, as illustrated in FIG. 1. Preferably, waveguide sections 12 are joined together to form a waveguide 11. FIGS. 6 and 7 illustrate preferred embodiments for two types of couplers—electric and magnetic.

Referring to FIG. 5B, for a preferred embodiment, waveguide section 12 is hollow with an elliptical cross section, manufactured from any material that will efficiently contain and propagate radio frequency energy. Elliptical waveguide section 12, for example, may be fabricated from metal or plastic by extrusion, drawing, or modification of a precursor shape, or any other means, to obtain adequate dimensions and ratios in its final cross section to efficiently propagate microwave energy. The inner surface of the resultant waveguide should be a smooth, highly conductive surface, such as a metallic surface of copper, aluminum, silver, or gold. The ends of each waveguide section 12 are formed to allow complementary edge-to-edge mating, either with other waveguide sections 12 or waveguide end shrouds 18 in FIGS. 5C and 5D that are made to fit over the outside of the end of waveguide section 12.

Other methods of fabricating waveguide section 12 include lining or coating the inner surface of a selected plastic or metallic longitudinal shape with a highly conductive material such as copper, aluminum, silver, or gold, as represented by coatings 314 and 320 in FIGS. 9A and 9B. If this method is used, accommodation may be made for directly connecting the conductors of magnetic signal couplers 34 and electric signal couplers 52 and end assemblies 14 or 16 to coatings 314 and 320 by continuing the inner conductive surfaces onto the faces of the ends of waveguide sections 12.

The waveguide specification for a given implementation of the principles of the present disclosure is a design choice based on the design trade-offs of a particular application, including use of other cross sectional configurations of a hollow waveguide, such as rectangular or circular, or use of waveguide that is not hollow, such as trough, coaxial or stripline types of transmission lines.

All hollow waveguide forms may be operated in more than one transmission mode. The present embodiment may be concurrently operated in one or more of these modes such as, if the waveguide is elliptical in cross section, both the eH11 and oH11 modes may be used by those frequency ranges which will be propagated efficiently by these modes. Preferably, the dimensions of the elliptical waveguide will be chosen to separate groups of frequencies which will be applied to each of the two modes. The cutoff frequency of the oH11 mode, for example, may be chosen to be higher than the highest frequency used in a separate, concurrent eH11 mode. If the chosen waveguide cross section is elliptical, and only one frequency group is to be propagated, then operation in the eH11 mode is preferred.

Referring to FIGS. 5A and 5B for the waveguide section 12, signal extraction is preferably accomplished using magnetic signal couplers 34 and/or electric signal couplers 52 attached to the waveguide and/or signals may be extracted by one or more radiator slots 28 formed in the waveguide section 12. These signal couplers and/or slots are located at pre-positioned or at post-fabrication selectable points along waveguide section 12 to establish a desired wireless signal distribution profile, as illustrated, for example, in FIGS. 2A and 2B. Preferred embodiments of magnetic signal couplers 34 and electric signal couplers 52 are described in connection with FIGS. 6 and 7.

As shown in FIG. 5B, electric signal coupler 52 is inserted into preferably pre-formed coupler aperture 24 located in the broad face of elliptical waveguide section 12, or magnetic signal coupler 34 is inserted into the preferably pre-formed coupler aperture 54 in the narrow face of waveguide section 12 to allow operation of each in the preferred eH11 waveguide mode. The preferred position for an aperture will usually be along the midline of a face of the waveguide, however, deviations from the midline position are possible and may be desirable in some applications. Electric signal coupler 52 and magnetic signal coupler 34 may be preset in their coupling coefficient at the time of manufacture, or may be adjusted in the field to comply with the requirements of a particular application.

The probe placements depicted in FIG. 5A assume the employment of elliptical waveguide mode eH11. Either probe, when used in the depicted positions, will excite the eH11 mode. If another mode is used, such as mode oH11, for example, the position of the two types of probes shown in FIG. 5A should be reversed. Other modes that are supported by a particular waveguide may me chosen, such as "overmoded" operation where a frequency significantly higher than the natural (lower) cutoff frequency of the waveguide is employed. Overmoded operation may necessitate the addition of mode suppression devices, such as vanes, inside the waveguide.

As described further in connection with FIG. 6, the coupling coefficient of electric signal coupler 52 may be varied by controlling the insertion depth of electric probe 210 that is part of electric signal coupler 52 into waveguide section 12. As described further in connection with FIG. 7, the coupling coefficient of magnetic signal coupler 34 may be adjusted by changing the area of magnetic loop probe 268, which is part of magnetic signal coupler 34, and/or by rotating magnetic loop probe 268 around its axis thereby presenting the maximum area of magnetic loop probe 268 to the orthogonal magnetic field lines of the signals in waveguide section 12.

FIG. 5B shows waveguide section 12 with two example radiator slots 28, coupler aperture 24 for electric signal coupler 52, and coupler aperture 54 for magnetic signal coupler 34. All apertures (openings) to waveguide section 12 may be covered by conductive material 170 prior to use in the field. A mechanical means of securing conductive material 170 may be employed, or conductive material 170 may be secured with a suitable adhesive material which will allow conductive material 170 to electrically appear as a part of a continuous wall of waveguide section 12 and conductive material 170 will not significantly disturb propagation of signals inside the waveguide when conductive material 170 is in place. Path 171 shows the relative motion of electric signal coupler's probe into waveguide section 12 and path 172 shows the relative motion of magnetic signal coupler's probe rotation in waveguide section 12.

FIGS. 5C and 5D illustrate end assemblies 14 or 16 that are provided coaxially to waveguide transitions at the ends of waveguide 11. Coaxial connector 20 is fastened to end shroud 18 with electrical and mechanical ground connection 174. The center conductor of coaxial connector 20 is attached inside the end assembly to probe 21, which is spaced approximately one-fourth wavelength, at the waveguide operating frequency, from the reflecting end 178 of the end assembly. Probe 21 is preferably approximately 0.02 wavelengths in diameter and approximately one quarter waveguide wavelength long at the desired frequency of operation, but may be of larger or smaller diameter for some applications and is chosen for an optimal impedance match of the probe to the waveguide. The maximum efficiency of energy transfer from waveguide 11 to probe 21 is obtained by adjusting the distance of probe 21 from reflecting end 178 while concurrently adjusting the length of probe 21 inside the end assembly.

The circumference of the cross sectional shape of end assemblies 14 or 16 may be configured to be slightly larger than the cross sectional shape of the waveguide sections 12 to allow end shroud 18 to slide-fit over waveguide section 12 and make good mechanical and electrical contact. End shroud 18 is preferably constructed from a highly conductive metal, with a wall thickness that is as thin as possible for lowest manufacturing cost, but with adequate strength to support its intended shape. Relief slots 175 provide a method of slightly reducing the circumference of the lip of the assembly when it is placed over the end of waveguide section 12 and compressed to allow good electrical and mechanical contact of end shroud 18 to waveguide section 12. End shroud 18 may be retained in place and brought into good electrical contact with waveguide section 12 by using an encircling mechanical strap around the waveguide and end shroud 18, or by using any other appropriate securing device. Another acceptable cross sectional shape for end shroud 18 is one that matches the end shape and dimensions of waveguide section 12. In that case, end shroud 18 would attach to waveguide section 12 with a mechanical connector and clamp method, such as, one similar to that shown in FIG. 8C.

The inner surface 179 of end shroud 18 is a highly conductive material, such as copper, aluminum, silver, or gold that has a preferred thickness of greater than approximately five times the effective radio frequency electrical conductivity skin depth at the lowest frequency of operation to minimize power dissipation inside end assemblies 14 or 16.

FIG. 5E shows an alternate embodiment in which waveguide section 12 is configured for simultaneous insertion and extraction of two separate groups of frequencies, F1 and F2. Substantially identical electric signal couplers 52 are inserted orthogonally into the midlines of the faces of the two axes in an elliptical waveguide. Although the same group of frequencies may be used, it is preferred that the two groups of frequencies represent separate frequencies to minimize a possible conflict in waveguide modes (mode hopping) or coupling from one axis of waveguide section 12 to the other. Separation of frequencies may be enhanced by the proper selection of the dimensions of the type of waveguide chosen, as is described in the technical literature. Optionally, magnetic signal couplers 34 may be substituted for electric signal couplers 52 for both axes in FIG. 5E. If two simultaneous modes are used, then end assemblies 14 and 16 must also be fitted with an additional, orthogonal probe, as shown in FIG. 5D, which will allow propagation and termination of the second mode. This second probe 173 has the same characteristics as probe 21, and should be positioned, preferably, in an aperture along the midline of the face and is positioned such that it is preferably approximately three quarters of a wavelength away from probe 21 and distal to the end of the waveguide.

Signal Couplers

FIG. 6 illustrates a preferred electric signal coupler 52 for coupling wireless signals out of, and into, waveguide section 12. Electric signal coupler 52 is composed of four sections: 48, 216, 218, and 220.

Section 48 comprises a coaxial connector output port appearance and is composed of threaded ground shell 186, insulating spacer 184, and center conductor 182. Coaxial connector 48, and its analogous coaxial configurations, may be optionally designed to mate with any standard or non-standard coaxial connector of any appropriate impedance, and may be male, female, or hermaphroditic. Size parameters of the outer diameter of center conductor 182, the inner diameter of threaded ground shell 186, and the relative dielectric constant of insulating spacer 184 determine the impedance of the connector, and represent choices based on known formulas and design criteria. Coaxial connector 48 may be eliminated if section 216 is connected directly to the feed system of an antenna.

The extraction of energy from the electric field of a waveguide involves controlling the depth of a probe inserted into the waveguide. Preferably, the amount of disturbance to the fields in the waveguide caused by an inserted probe should be minimized while extracting a predetermined amount of signal power. It is known in the art that the amount of signal power extracted by an electric probe inserted into a waveguide is generally proportional to the length of the probe inserted into and parallel to the area of maximum electric field in the waveguide. If less than a maximum amount of energy is to be coupled out of the waveguide, a probe with a length less than a quarter wavelength may be used. Viewing a probe of less than a quarter wavelength as a short antenna, it is recognized that a short probe is a very poor impedance match to an external, standard, desirable, coaxial impedance, such as 50 ohms.

With respect to electric signal coupler 52 in FIG. 6, electric probe 210 is configured as a screw that may be extended into the interior of waveguide section 12 by an adjustable amount during manufacture, installation, or setup of a waveguide system. If impedance matching were not performed, a probe inserted into a waveguide would need to be excessive in length to couple sufficient energy from the probe to a mismatched, standard, non-reactive load. Excessive probe lengths inserted into the waveguide will exhibit unwanted reactance inside the waveguide section 12 which may cause detrimental reflections in the waveguide and may limit the total amount of power extracted from the waveguide system, and may also cause unwanted, excessive variations in amplitude response of the waveguide across the band of frequencies employed. For example, a short probe of approximately 0.1 wavelength placed above a conducting ground plane, such as the interior of waveguide section 12, has a feed-point impedance that exhibits a resistive component in the range of a few ohms, and a capacitive reactance component of several hundred ohms. Power transfer efficiency from an uncorrected impedance in this range to a standard 50 ohm load would be very low.

The purpose of section 216, section 218, and optional metallic cylinder 208 and dielectric attachment 230, is to transform and correct the impedance of the inserted electric probe 210 that is part of electric coupler 52 to a standard impedance, such as 50 ohms, or any other standard impedance, for output to coaxial connector 48, to maximize power transfer from the minimally inserted electric probe 210 to the load connected to the output of the signal coupler. Electric signal coupler 52 offers a unique design to efficiently couple energy from a waveguide.

Tracing signal flow from an outside source through electric signal coupler 52, signal voltage is first impressed upon center conductor 182 of coaxial connector 48, which is in turn connected to center conductor 192 which is hollow and coaxial to ground shell 188. Coaxial connector 48, and its analogous coaxial configurations, may mate with any standard or non-standard coaxial connector, of any appropriate impedance. Ground shell 188 encircles center conductor 192 which is surrounded by dielectric 190, which may be any suitable dielectric that has an adequate dielectric constant and low dissipation losses at the desired frequency of operation. Section 216 forms a quarter wave transmission line at the desired operating frequency and is calculated to have an appropriate, lower characteristic impedance than the load impedance to which electric signal coupler 52 is connected through coaxial connector 48. Section 218 is an additional quarter-wave section that is lower in impedance than section 216. The lower impedance of section 218 is accomplished by increasing the diameter of center conductor 200 and/or surrounding center conductor 200 with dielectric material 198 that has an elevated relative dielectric constant and low dissipation factor at the desired frequency. If an insulator with a higher relative dielectric constant is used, the velocity factor of section 218 is decreased, resulting in a physically shorter section 218, as shown in this example configuration.

Thus, taken in tandem, sections 216 and 218 form a two-stage, quarter-wave impedance transformer at, and near, the desired operating frequency. Center conductor 192 surrounds the screw that forms electric probe 210, which is held within center conductor 192 by a metal spacer/contact 194 that is in electrical and mechanical contact with the inner surface of center conductor 192. The space between the bottom of area 202 and the bottom of metal spacer/contact 194 forms the inner volume of a shorted section of coaxial transmission line that is variable in length, but less than a quarter wavelength at the operating frequency.

Since the impedance of a shorted transmission line of less than a quarter wavelength is inductive and is proportional to the product of the tangent of the electrical angle of the physical line and the characteristic impedance of the coaxial line, the impedance formed by the internal section of electric probe 210 and the inner surface of the center conductor 192 is a variable inductive reactance added to the impedance looking into electric signal coupler 52 from the inside of waveguide section 12. This inductance is in series with, and is used to cancel out, the high capacitive reactance exhibited by an electric probe 210 of short length that is inserted into waveguide section 12. Looking back toward the output load, sections 218 and 216 transform the low resistance of the probe, whose reactance has been cancelled, to a standard, higher resistance, low-reactive impedance for the purpose of maximum power transfer to the load connected to coaxial connector 48. Position indication 212 shows the motion of variable movement of electric probe 210 inside waveguide section 12 to sample different amounts of coupled energy.

Metal spacer/contact 194 is threaded in its center to allow electric probe 210 to be raised or lowered on the threads of electric probe 210 with reference to the inner surface 204 of waveguide section 12, while metal spacer/contact 194 is stationary within center conductor 192, allowing variation of the depth of penetration of electric probe 210 into waveguide section 12. Metal spacer/contact 194 may also be moved within center conductor 192 to allow different probe penetration depths into waveguide section 12, while remaining in good electrical contact with the inside of center conductor 192, which allows optimal probe insertion depth, and concurrent addition of the necessary inductive reactance to tune out capacitive probe reactance by positioning metal spacer/contact 194 within center conductor 192, which changes the length of the enclosed, shorted, coaxial transmission line.

An optional metallic cylinder 208 may be added as a capacitance hat to increase the surface area of electric probe 210, thus further lowering the capacitive reactance of the probe when a short electric probe 210 length is utilized. Likewise, dielectric attachment 230 may be appended to optional metallic cylinder 208, to further decrease capacitive reactance of electric probe 210 and obtain a closer impedance match with reduced disturbance to the fields inside waveguide section 12 when a short probe is required. Electric probe 210 is preferably constructed from a highly conductive material on its surface, such as copper, silver, aluminum, or gold. The thickness of the surface material of this probe preferably should be greater than five times the radio frequency skin depth at the operating frequency.

Collar 206 is mechanically and electrically attached to ground shell 188 as a means of guiding electric signal coupler 52 through aperture 24 of waveguide wall 226, and also provides a ground contact surface for the bottom of electric signal coupler 52 to waveguide section 12. Collar 206 may take the form of a pre-installed mechanical component of electric signal coupler 52 and/or may be part of aperture 24 in the wall 226 of waveguide section 12.

Flange 224 is mechanically and electrically attached to ground shell 188 at junction point 222. Flange 224 contacts the outer surface 228 of waveguide section 12 and serves as a compression point for connecting straps or other methods of securing electric signal coupler 52 to waveguide section 12, and performs both as part of a physical mounting mechanism and as a suitable ground for the bottom of electric signal coupler 52 at outer surface 228 of waveguide section 12.

Those skilled in the art will appreciate numerous routine design optimizations and other possible configurations for implementing the electric signal coupler 52, or other embodiments of an electric coupler used for the general purpose of coupling signal energy out of waveguide section 12. For example, achieving a desired impedance match may include using none, one, or more than one, quarter-wave impedance transformation sections, or transmission line sections other than quarter-wavelength lengths in lieu of, or in combination with, the described method of reactance cancellation, or may employ tapered line sections, or lumped constant networks, for the purpose of impedance transformation and correction.

FIG. 7 illustrates an exemplary magnetic signal coupler 34 for coupling wireless signals out of, or into, a waveguide section 12. Magnetic signal coupler 34 is composed of four sections: 49, 274, 276 and 278.

Section 49 comprises a coaxial connector output port composed of ground shell 242, dielectric spacer 244, and center conductor 246. Coaxial connector 49, and its analogous coaxial configurations, may mate with any standard or non-standard coaxial connector, of any appropriate impedance, and may be male, female, or hermaphroditic. Size parameters of the outer diameter of center conductor 246, the inner diameter of ground shell 242, and the relative dielectric constant of dielectric spacer 244 determine the impedance of the connector, and represent design choices based on known formulas and design criteria. Coaxial connector 49 may be eliminated if section 274 is connected directly to the feed system of an antenna.

Following coaxial connector 49 is section 274, comprised of a ground shell 248 which concentrically encircles a center conductor 254, which is hollow and coaxial to ground shell 248 and is surrounded by insulation 252, which may be any suitable dielectric, including air, that has low dissipation losses at the desired frequency of operation. Center conductor 254 is internally connected to screw 262 through metal spacer/contact 250. Screw 262 is electrically and mechanically connected to one end of a magnetic loop probe 268 at connection point 264. Region 258 is composed of a dielectric material.

Magnetic loop probe 268, which is part of magnetic signal coupler 34, is inserted into an area of an elevated magnetic field in waveguide section 12 to inject or extract energy from waveguide section 12. Preferably, the amount of disturbance to the fields in the waveguide caused by an inserted conductor loop probe should be minimized. It is known in the art that the amount of signal power extracted by a magnetic probe inserted into a waveguide is generally proportional to the amount of magnetic field lines intercepted by the loop, which is determined by the area of the loop and its orientation in the magnetic field of the waveguide. If less than a maximum amount of energy is to be coupled out of the waveguide, a magnetic loop probe 268 with a small cross sectional area may be used. A magnetic loop probe 268 of small cross sectional area (less than approximately 0.1 wavelength in wire length), when viewed as a small loop antenna, is, however, a very poor impedance match to a standard, desirable, coaxial impedance, such as 50 ohms.

Efficient extraction of energy from waveguide section 12 requires minimizing the cross sectional area of the magnetic loop probe 268 to limit the amount of disturbance to the electromagnetic fields in waveguide section 12, while extracting a predetermined amount of power from the waveguide. If less than a maximum amount of energy is to be coupled out of the waveguide, the cross sectional area presented by magnetic loop probe 268 is reduced to a minimum, while still coupling sufficient power out of the waveguide section 12.

Magnetic loop probe 268 is preferably constructed from a conductor having a highly conductive material on its surface, such as copper, silver, aluminum, or gold. The thickness of the surface material of this probe preferably should be greater than five times the radio frequency skin depth at the operating frequency. The impedance of a small version of magnetic loop probe 268 is typically low in resistance (0.1 ohms to a few ohms) and exhibits inductive reactance of up to a few hundred ohms. Impedance correction and transformation is required to optimize signal transfer from a magnetic loop probe 268 of small size inserted into waveguide section 12. For maximum efficiency of power transfer, the impedance of magnetic loop probe 268 is corrected and transformed to the impedance of the load connected to coaxial connector 49. If impedance matching is not performed, a conductor loop probe inserted into waveguide section 12 would need to be excessive in size and would form a larger loop than necessary inside the waveguide in order to couple sufficient power under mismatched conditions from magnetic loop probe 268 to a standard, non-reactive load, such as 50 ohms. An excessively large, reactive, magnetic loop probe 268 inserted into the waveguide will also cause detrimental reflections in the waveguide and may limit the total amount of power extracted from the waveguide system, and may also cause excessive variations in amplitude response across the band of frequencies employed.

Magnetic loop probe 268 adjustably extends inside waveguide section 12, to selectably increase the cross-sectional area presented by magnetic loop probe 268 to the inside of waveguide section 12 in an area of elevated magnetic field inside the waveguide. Rotation of magnetic signal coupler 34, as depicted by rotation 270, may also be used to adjust magnetic loop probe 268 to variably orient it to the magnetic field inside waveguide section 12 to effect different degrees of signal coupling. Sections 276 and 274, in tandem, transform the low radiation resistance component of the impedance of the inserted loop probe to 50 ohms, or any other desired standard impedance. Section 274 forms a quarter-wave coaxial transmission line at the desired operating frequency and is calculated to have an appropriate, lower, characteristic impedance than the load impedance to which magnetic coupler 34 is connected through coaxial connector 49. Section 276 is an additional quarter wave coaxial section that is lower in impedance than section 274. The lower impedance of section 276, in comparison to section 274, is accomplished by increasing the diameter of center conductor 254, as depicted by center conductor 260, and/or by surrounding center conductor 260 with dielectric material 256 that has an elevated relative dielectric constant and low dissipation factor at the desired frequency. If a higher relative dielectric constant insulation material is used, the velocity factor of section 276 is decreased, resulting in a physically shorter section 276. Taken in tandem, sections 276 and 274 form a two-stage coaxial impedance transformer. Section 276 and 274 transform the low resistance of the probe to a useful, standard, impedance for maximum power transfer to the load connected to coaxial connector 49.

Screw 262 is secured within center conductor 254 by metal spacer/contact 250 in electrical and mechanical contact with the inner surface of center conductor 254. The space between the bottom of metal spacer/contact 250 and the bottom of center conductor 260 forms a shorted section of a coaxial transmission line that is variable in length between a quarter and a half wavelength at the operating frequency. Since the impedance of a shorted transmission line of this wavelength is capacitive and is proportional to the product of the tangent of the electrical angle of the physical coaxial line and the characteristic impedance of the coaxial line, the impedance formed by screw 262 and the inner surface of center conductor 254 is a variable capacitance added to the impedance looking into magnetic signal coupler 34 from the inside of waveguide section 12. This capacitance is in series with, and is used to cancel out, the inductive reactance presented by magnetic loop probe 268.

Metal spacer/contact 250 forms a sliding contact inside center conductor 254, which allows screw 262 to be raised or lowered with reference to the bottom of center conductor 260 which serves to vary the length of magnetic loop probe 268 in waveguide section 12 for the purpose of setting the cross sectional area of the loop probe within the waveguide. Metal spacer/contact 250 may be moved within center conductor 254 while remaining in good electrical contact with the inside of center conductor 254, allowing the inductive reactance of magnetic loop probe 268 to be cancelled by the adjusted position of metal spacer/contact 250 within center conductor 254.

Collar 277 is mechanically and electrically attached to ground shell 248 of magnetic signal coupler 34. It is used as a means of guiding the coupler assembly through the coupler aperture 54 in waveguide wall 226, and provides a ground contact point for the bottom of the coupler assembly to waveguide section 12. Collar 277 may take the form of a pre-installed mechanical and electrical grounding connector of magnetic signal coupler 34 and/or may be part of the aperture in wall 226 of waveguide section 12. Flange 272 is mechanically and electrically attached to magnetic loop probe 268 at junction point 266, and to the outer surface 228 of waveguide section 12, but allows rotation of magnetic signal coupler 34 prior to final tightening of the position of magnetic signal coupler 34. Flange 272 serves as a compression point for retaining straps or any other method of securing magnetic signal coupler 34 to waveguide section 12, acting both as a mounting mechanism and as a suitable ground for the bottom of magnetic signal coupler 34 to waveguide section 12 at waveguide outer surface 228.

Those skilled in the art will appreciate numerous potential design optimizations for implementing magnetic signal coupler 34, or other embodiments of this magnetic coupler, for the general purpose of coupling signal energy out of a waveguide that is part of this waveguide-based wireless distribution system. Achieving a desired impedance match may include using, for example, none, one, or more than one, quarter-wave impedance sections, tapered transmission lines, a lumped-constant impedance transformation network, or transmission line sections of any type of adjusted lengths in lieu of or in combination with, the described method of impedance cancellation.

Section Connection

FIGS. 8A through 8C illustrate exploded and assembled views of an exemplary waveguide section connection embodiment. A preferred elliptical waveguide section 12 is mechanically and electrically connected to another waveguide section 12 with section connector 22. Referring to FIGS. 8B and 8C, section connector 22 is comprised of metallic shroud 300, straps 298 and optional clamp receiver assemblies 296. Straps 298 are secured with clasps 304, which may use a common helical screw-driven type hose clamp tensioning mechanisms, or may be any other type of mechanism which will apply tension to straps 298, such as, preferably, fold-over type securing clasps on straps 298, with pre-adjusted tension in their closed position. Optional clamp receiver assemblies 296 are attached on opposite sides of metallic shroud 300 and mate with optional clamp receivers 294 on waveguide section 12.

Assembly of a completed connection of two waveguide sections 12 is accomplished by preferably first cleaning the inner surface of metallic shroud 300 to a bright metallic finish. The outer surfaces of the ends of waveguide section 12 are also prepared to a bright metallic finish for high electrical contact conductivity with metallic shroud 300. The two ends of waveguide sections 12 are then inserted into metallic shroud 300 from opposite directions. The two ends of waveguide section 12 are preferably positioned to meet near the middle of metallic shroud 300 with both ends of waveguide sections 12 oriented with their axes collinear. The strap 298 that is opposite to the end of metallic shroud 300 and closest to optional clamp 292 is then placed around metallic shroud 300 and tightened sufficiently around metallic shroud 300 to hold it in position without metallic shroud 300 slipping with respect to the end of waveguide section 12 that is underneath it. Optional clamp receiver assemblies 296 and optional clamp receivers 294 are then engaged to draw the two ends of waveguide sections 12 together to close proximity. The two waveguide section 12 ends should preferably meet inside metallic shroud 300, but a gap on the order of approximately 1-3 millimeters is acceptable for adequate operation. All clasps are then completely tightened, which causes metallic shroud 300 to encircle and tighten onto waveguide section 12 and make good electrical contact. Tightening of straps 298 around metallic shroud 300 also causes any small variations in the shapes of the ends of the waveguide sections to conform to an average, preferred shape. When completed, the longitudinal edges of metallic shroud 300 should preferably be near the midline 302 one of the broad faces of waveguide sections 12.

Waveguide

The basic waveguide shape required for the system may be fabricated by extrusion or drawing to the requisite shape, or formed into an intermediate shape that is subsequently finished to the final form. If metallic, preferred metals for the waveguide include aluminum or copper. If plastic, a highly conductive coating is placed on the internal surface of the completed waveguide. Any material that is formable in a process, such as polyvinylchloride (PVC), is acceptable. Another method of fabrication is to form the waveguide cross section from a standard shape of metal or plastic that is generally available, and modify it through a process, such as compression, to form it into the shape of the desired cross section.

FIGS. 9A and 9B respectively illustrate alternate embodiments for forming a waveguide section using metalized foil or metalized pipe. Outer pipe 310 in FIG. 9A may be of any material that will hold the required shape to constitute a waveguide cross section at the desired frequency. Material 312 is then inserted into outer pipe 310, either at manufacture or later, such as during installation. Preferably, material 312 is relatively thin, such as a metallic foil or a plastic sheet material which has been coated with a smooth conducting surface, coating 314, that is of sufficient thickness and conductivity at the intended microwave frequency to efficiently propagate waveguide energy longitudinally along the inner surface of coating 314. If material 312 is split in order to be inserted into outer pipe 310, gap 316 should be minimized and oriented down the length of the waveguide along the line of the least current flow in the inner wall of the waveguide.

FIG. 9B shows an alternate method of creating a waveguide from shape 318 that is formed in a consistent longitudinal cross section. Coating 320 has high conductivity and is applied to the inner surface of shape 318 for the purpose of supporting the propagation of microwave energy down the length of the inner surface of coating 320 of shape 318. Coating 320 may be any conductor which supplies sufficient conductivity to accomplish low-loss propagation in the waveguide assembly and may be applied by any method that supplies a smooth, highly conductive surface to the inner surface of shape 318. Any hollow form of consistent cross-sectional shape capable of propagating radio frequency energy at the desired frequency is applicable for use in constructing the examples illustrated in FIGS. 9A and 9B. If waveguide construction methods in 9A and 9B are employed, then suitable grounding methods should be added to magnetic signal couplers 34 and electric signal coupler 52 to attach them to the described inner conductors. This grounding method may include, for example, extending the inner conductor in 9A or 9B to the end and outside edges of the waveguide section 12.

Configurable Waveguide-Based Wireless System

FIGS. 10A, 10B and 10C illustrate an exemplary implementation of the waveguide-based wireless distribution system of the claimed subject matter, adapted and configured for post-installation adjustment of signal coupling to signal connectors using motorized signal couplers along waveguide 11 that are each remotely and selectively adjustable after installation.

Referring to FIG. 10A, the configurable waveguide system is shown with controllers 348 and 336 attached to a waveguide 11 with end assemblies 14 and 16, including coaxial connectors 20 and internal transmitting probes (probe 21 in FIGS. 5C and 5D), which constitute launch and terminating assemblies, respectively, for injecting microwave energy into, or extracting signals out of, the ends of waveguide 11. Signals are connected, for example, from signal interface assembly 30 (as shown in FIG. 1, but not shown here) to coaxial connector 20 on end assembly 14. End assemblies 14 and 16, and signal interface assembly 30 in this embodiment, have the same attributes and capabilities as described with reference to FIG. 1. Controllers 348 and 336 are attached to apertures placed in waveguide sections 12 at desired positions along the length of the total assembled waveguide 11. They control the coupling coefficients of probes 352, which may be either electric or magnetic loop types, or radiating apertures 334. Impedance transformer 354 integrated into controllers 348 provides output to connector 346 which are subsequently connected directly to antennas, or to coaxial cable which is connected to antennas, or to another waveguide system using coaxial cable, or any other type of transmission line interconnecting method.

Control signal assembly 332 may comprise a cable of one or more conductors of sufficient conductivity to transport the necessary power and control signals to all of the controllers 348 and 336 connected in the system. A separate conductor, or conductors, in control signal assembly 332 may be assigned to each controller 348 and 336, or a reduced number of conductors in a cable may be used in a parallel or serial-configured, multiplexed signaling control system. Decoding of control signals in controllers 348 and 336 may be accomplished by either active or passive means. A cable such as that found in standard in-building Ethernet or telephone wiring installations are preferred examples of suitable types of cable that may be used for connection of controllers 348 and 336. The type of cable used, whether plenum or non-plenum rated, will be determined by individual applications.

The connection point 344 at each controller may be accomplished by pre-installed connectors on control signal assembly 332 and/or controllers 348 and 336 by using an insulation displacement type connection as a connection method to control signal assembly 332, if cable, as it passes through, or adjacent to, a section of controllers 348 and 336. As few as one wire may be used for powering and controlling all controllers if serial control signaling and power supply feed are multiplexed onto the single conductor with waveguide 11 used as a suitable return path for power and signals. A separate, external, groove or channel may be incorporated during fabrication in the lengths of waveguide sections 12 for the purpose of physically retaining control signal assembly 332 if it is a cable. Connector 346 is the output port for signals recovered from the waveguide by controller 348 through an impedance correction section 354, whose characteristics are essentially the same as discussed in connection with FIG. 6 or FIG. 7. Connector 346 may be any standard or non-standard radio frequency connector. Radiation proceeds directly from variable waveguide radiating aperture 334 whose dimensional characteristics, and therefore radiation characteristics, are controlled by controller 336 by commands over control signal assembly 332.

The input of detector 342 is shown attached to coaxial connector 20 of end assembly 16. Detector 342 is any device that converts radio frequency signals into a voltage that is proportional to radio frequency signal levels presented to it by waveguide 11. The output of detector 342 may be connected to control signal assembly 332 with the output of detector 342 sensed as a calibration and test signal for adjusting the proper operation of the waveguide system. Detector 342 may be any microwave detector, of either passive or active design, that will measure the signal level in the waveguide, either at the end of the waveguide, or at any intermediate point using a low-loss (quarter wave) probe, or a signal coupler. For example, detector 342 may be composed of a radio frequency diode detector attached to a low-loss waveguide probe that terminates the impedance of the waveguide in an essentially non-reflecting load at the end of the waveguide, or, if used at an intermediate point along the waveguide, it would be used with an electric signal coupler 52 or magnetic signal coupler 34 to allow minimal sampling of energy from the waveguide, while providing signal measurement.

Since the unloaded loss of multiple tandem lengths of waveguide sections 12 connected into a complete waveguide system is predictable with sufficient accuracy, the signal level change indicated by detector 342 resulting from the extraction of a signal at any other port in the waveguide system that is between the signal source and detector 342 may be predicted as a function of the amount of RF loading that each controller 348 or slot controller 336 places on the waveguide. Conversely, each controller 348 or slot controller 336 may be adjusted to a desired coupling coefficient by monitoring the detected output level from detector 342 during the adjustment of each controller. Manually adjustable probes may also be used in combination with controllers 348 and 336 to configure a desired waveguide signal distribution system.

It may be desirable in some applications for detector 342 to be adjusted to absorb the least amount of microwave energy out of the waveguide that is consistent with reliable detected signal levels. In this event, detector 342 may be configured with an optional post-detection amplifier which is powered over control signal assembly 332. Controller 330 may allow remote, manual control of controllers 348 and 336 over control signal assembly 332 while an operator monitors the output of one or more detectors 342. Alternately, controller 330 may be operated under control of a computer. In the latter case, the computer may be used to calculate the adjustment of each of the desired signal levels presented on connectors 346 of the controllers 348 and radiating apertures 334 on the waveguide system by using computations that determine the proper setting for each controller 336 and 348 from levels reported by one or more detectors 342 and known attenuation characteristics of waveguide 11.

Connectors 346 on the controllers 348 or 336 may be connected directly to signal radiators (not shown), or through coaxial cable to signal radiators, or may be connected to a coaxial connector 20 of a separate waveguide system as an extended transmission line and/or separate waveguide-based wireless distribution system serving an additional area. When interconnecting additional completed waveguide distribution systems, filtering, combining, and other standard techniques and devices may be added between sections to selectively allow or disallow one or more groups of frequencies.

Cable 340 at the end of control signal assembly 332 may be continued to additional controllers 348 and 336 (not shown) when a section of waveguide 11 is extended out to its practical length limit. Detector 342, coaxial connector 20, and end shroud 18, are then moved to the end of the extended waveguide 11 section(s). The maximum length of waveguide 11 is determined by the total unloaded attenuation of tandem waveguide sections 12, and the sum of signal power required by all attached ports, versus the total signal power available from the source or sources presented to the waveguide system. One or more detectors 342 may be added to subsequent runs of waveguide 11 lengths to facilitate monitoring downstream signal levels.

FIG. 10B shows the functional details of probe controller 348 attached to the outer surface 228 of a waveguide section 12, through wall 226 of the waveguide 11. Probe 352 may be either an electric or magnetic probe assembly. If the probe is electric, then coupling variation is accomplished by the amount of insertion of probe 352 into waveguide section 12 as shown by relative insertion position 351. If the probe is magnetic, then the amount of coupling is determined by both the loop probe area, and the amount of rotation into the inner magnetic field of waveguide section 12 by probe 352 as a loop as shown by rotation position 350. Either type of probe is impedance matched to the impedance of connector 346 by impedance transformer 354 which may be, for example, as described with respect to FIG. 6 or 7, and may contain one or more sections of appropriate quarter wave transmission line sections in tandem or another type of impedance matching technique which is chosen for its impedance-transforming characteristics, and may also contain circuitry for appropriate cancellation of the reactance introduced in the input section of impedance transformer 354. Impedance transformer 354 may also contain a detector function, similar to detector 342 described herein, and may be used for the purpose of monitoring the output of each controller 348 in order to accurately set the proper power coupled from waveguide section 12.

Probe 352 is actuated to cause either insertion or rotation of an electric probe or magnetic probe, respectively, in waveguide 11 by action of gear box 341, which is driven by motor 343, which receives commands from motor drive circuit 345, which is driven by data signals of either analog and/or digital nature from decoder 347, which communicates with controller 330 over control signal assembly 332. Position indications from position sensor 349 may be read back over control signal assembly 332 to controller 330 for the purpose of determining either translation or rotation position data, respectively, of probe 352.

FIG. 10C shows the functional details of slot controller 336, which is a variation of controller 348. It controls the window size of radiating apertures 334 in a waveguide section 12, allowing direct, controllable, levels of radiation from the waveguide into an intended area in the vicinity of the waveguide system. Slide assembly 359, a conformal and conductive sheet of material on the outer surface 228 of waveguide section 12, is mechanically driven to variably occlude radiating aperture 334 by translational movement 353 from gear box 341, which is driven by motor 343, which is electrically driven by motor drive circuit 345, which receives commands decoded by decoder 347, which receives signals over control signal assembly 332 from controller 330. Controller 330 may be operated manually by remote electrical control, or may be operated by computer control. Position sensor 349 senses the position of slide assembly 359 and reports that position to controller 330 over control signal assembly 332. Slide assembly 359 may occlude radiating aperture 334 by motion parallel with, or orthogonally to the long axis of radiating aperture 334, or a combination of translations thereof.

FIG. 10D shows an embodiment of the claimed subject matter used for the dual purposes of distributing wireless information and concurrent use as a quiescent fire extinguishing system. Waveguide pipe section 355 is made with appropriate strength to contain the pressure of a gas used in a "dry" extinguishing system, when pressurized at the time of use, and may also have an inner surface that is coated with an appropriate conductor, such as copper, aluminum, silver, or gold for the waveguide propagation of radio signals. The sections are connected together with pipe joints 356. The preferable shape of the pipe is elliptical, but any other shape which will conduct wireless signals as a waveguide, such as circular or rectangular cross-section may be used. Signals are coupled out of the waveguide pipe section 355 by couplers 357, which may have the same characteristics as described for magnetic signal coupler 34 and/or electric signal coupler 52, and are applied to emitter heads/antennas 358, which act as both wireless radio antennas and normal heat-activated fire extinguisher heads. The pipe is normally dry internally and pressurized with air or another gas, such as nitrogen. Emitter heads/antennas 358 open a path and release air pressure in waveguide pipe section 355 upon detection of heat, otherwise, they act as antennas connected to waveguide pipe section 355. The general requirements of pneumatic/fluid plumbing and waveguide transmission technology must be simultaneously met in constructing the system.

Waveguide Forming

FIG. 11 illustrates an exemplary embodiment for forming waveguide section 12 sections from flat, rolled, sheet metal stock that, when formed, retains a highly conductive, smooth inner surface. A supply roll of smooth-surfaced, sheet metal of either homogeneous metal or a foundation metal, such as steel, coated or bonded with copper, aluminum, or any other highly conductive material may be utilized. The required width of sheet material needed to form a component of the final shape is suspended in a sheet material supply reel 370, such as a roll, at one end of forming machine 390 that is supported on stand 382. The preferred material is required to have a highly conductive metal surface, such as aluminum or copper that has good retention of dimensions after the forming process. Plastic material may also be used if it is formable into, and will retain, the requisite shape. It should have good structural strength and may be coated, by mechanical or electrical processes, with a highly conductive material, such as copper, aluminum, silver, gold, or any other material of sufficiently high electrical conductivity. Alternatively, it may be pre-coated with a sufficiently conductive material on one broad surface that will become the inner surface of a waveguide section 12.

A single layer of material 372 is fed into first a punch station 374 where desired aperture holes and/or radiator slots and/or assembly holes are punched. The punched sheet metal or metalized plastic is then taken through a forming section 376, where the penultimate shape 380 of the waveguide is imparted to the material.

Some possible pre-waveguide cross-sectional shapes resulting from processing in forming machine 390 are illustrated in shapes 384, 386 and 388. After the material is punched and formed, cutter 378 is used to cut the waveguide components into sections of desired lengths, which may be from a few inches, to hundreds of feet in length, depending on the particular application in a facility. The total length of a section of waveguide is limited only by the length of the supply contained on example sheet material supply reel 370. Shapes 384 show some possible cross sections that may be produced that have the two outer, longitudinal, edges of the original material that will need closure to form a completed waveguide section. The placement of the edges shown in example shapes 384 are in preferred positions for the propagation modes in which these waveguide sections 12 are normally operated. An additional processing stage for the purpose of sealing the edges of shapes, 384, 386, and 388 with, for example, crimps, may be added to forming machine 390.

Other possible shapes that may be produced by forming machine 390 are shown in shapes 386. These shapes, although they will require two sealing operations for closure, are easier to transport since they may be efficiently stacked by orienting them within each other. Shapes 386 would then be joined in the field by crimping, welding, or clamping methods to complete full waveguide sections 12 for installation in a waveguide-based wireless distribution system.

Any and all of the operations performed by the forming system described may be controlled by manual or automated means, such as a programmed, stored-logic controller or a programmable computer. If programmable, the forming system 390 will contain the requisite sensors and actuators needed for automated operation.

FIG. 12 illustrates another exemplary embodiment for joining waveguide sections 12 that uses fasteners for assembling a waveguide formed in two halves from sheet metal and, in a separate use of the concept, for mechanically and electrically connecting two sections of completed waveguide sections.

Formed waveguide sections 400, with inner, highly-conductive, smooth, metallic coating 402, and pre-positioned holes 404, are joined together and held in place by pins 406 and retaining clips 408. Rivets may also be used for this process. If used as a connector between two waveguide sections, formed waveguide sections 400 will be made slightly larger in dimensions than the formed waveguide sections to which it attaches, but will fit intimately and securely over both ends of the two waveguides that they join. Pre-positioned holes 404, in this case, will line up with holes positioned in the edges of the ends of the waveguide sections 12 to be joined. When waveguide sections 12 are made from the half sections shapes 384, 386, or 388, pre-positioned notches for apertures may be placed in the ridge lines, and/or the other broad and narrow faces of each shape of waveguide to accommodate signal couplers when the joining method of FIG. 12 is utilized. Radiating slots may likewise be placed in waveguide sections 12 at the time of manufacture.

FIGS. 13A and 13B illustrate an exemplary embodiment for assembling half sections of formed sheet metal into a complete waveguide using a continuous resistance welder to accomplish the joining process. FIG. 13A is a plan view of the exemplary welding system. Base 422 supports four spring-loaded or hydraulically compressed, electric welding wheels 424 which turn continuously and supply high current through the seams of waveguide 420 to be joined, while compressing both seams of half sections of waveguide 420. Sufficiently high current is applied to partially melt the seams of the half sections at their points of contact 426. If the material is metal, for example, the two seams are welded into a completed waveguide section with closed seams, as show in end view 428. FIG. 13B shows an end view of the resistance welding system. Sufficient current for welding is delivered to electric welding wheels 424 from an electrical power source connected to a connector 438 attached to electrical power conductor 440, through low-resistance brush assemblies 442 and 430, and through contacts 434 that are connected directly to electric welding wheels 424. Exiting current is carried out through cable 432, the return cable to the welding electrical supply. Drive motors 436 propel half sections of waveguide 420 through the welding process.

Test Results

FIG. 14 shows the results of measurement of the voltage standing wave ratio (VSWR) characteristics of an unloaded 200-foot elliptical cross-section version of a waveguide 11 constructed in accordance to the present disclosure using waveguide sections 12 and section connectors described and depicted essentially the same as in FIGS. 8A, 8B and 8C, and end sections as described and depicted in FIGS. 5C and 5D, but with no intermediary signal couplers or radiating slots along waveguide 11 for this test. An Anritsu model 331A Sitemaster sweep instrument was used to inject a swept radio frequency signal from 2400 MHz to 2500 MHz while sensing return signal power looking into one end of the system when the far end of the waveguide was terminated in a 50 ohm load at the coaxial connector on the far-end section. VSWR was then calculated from this data. As noted, very low levels of signal reflections are indicated across the band of interest.

FIG. 15 is another test of the unloaded 200 foot waveguide described in FIG. 14. An unmodulated signal of 9 milliwatts from a Hewlett Packard Company model 8620C/86290C microwave signal generator was swept from 2400 MHz to 2500 MHz to test the end-to-end loss of the 200 foot unloaded waveguide. Power at the end of the waveguide was measured with a Hewlett Packard Company model 435B/8485A power measurement instrument. The average loss, from input coaxial connector 20 to terminated output coaxial connector 20 at the far end, measured across this frequency band of interest, was slightly greater than 0.5 dB per 100 feet of waveguide length. These measured losses include launch and retrieval losses at the ends of the waveguide that are inherent to the coaxial connectors and probes in the end sections. Calibration of power output of the generator was performed at the end of the interconnecting cable used between the signal generator and waveguide input point, however, no cable slope compensation was employed to compensate for the frequency roll-off of an approximately 2.5 meter RG-58 coaxial cable that was connected between the signal generator and the transmitting end of the waveguide. The basic loss characteristics of the waveguide itself are therefore better than the displayed data.

FIG. 16 is yet another test of the 200 foot waveguide described with respect to FIG. 14. In this test, six electric signal couplers 52 were placed at 40 feet, 60 feet, 80 feet, 100 feet, 120 feet, and 140 feet from the transmitting end of the waveguide. The same signal generation and power measurement instruments as described in FIG. 15 were used for this test. An input power of 10 milliwatts was injected into the starting end coaxial connector of the waveguide transmission system. Each of the six couplers was adjusted to provide 1.10 milliwatts output. The average power, at the end of the system, across the indicated frequency range, was 2.01 milliwatts. Average deviation of signal level at the end of the system, across the frequencies tested, was approximately +/−1.5 dB.

The presently disclosed simplified, high-efficiency, distribution system for carrying wireless signals between a signal source and at least one location proximate to a signal receiver may be implemented in various manners. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A wireless distribution system comprising:
    a waveguide with a hollow cross-sectional structure and a conductive inner surface that supports the transmission of wireless signal energy from a wireless signal source to a location proximate to a wireless receiver location;
    an originating port connected to the waveguide for signal injection and extraction; and
    a signal coupling device coupled to the wireless waveguide, the signal coupling device includes:
        a conductive longitudinal ground shell;
        a hollow center conductor contained within the conductive longitudinal ground shell;
        a first dielectric contained within a first longitudinal section of the conductive longitudinal ground shell and surrounding the hollow center conductor contained within the first longitudinal section of the conductive longitudinal ground shell;
        a second dielectric contained within a second longitudinal section of the conductive longitudinal ground shell and surrounding the hollow center conductor contained within the second longitudinal section of the conductive longitudinal ground shell; and
        a conductive longitudinal probe with a proximal end partially contained within the hollow center conductor thereby forming a section of a transmission line within the hollow center conductor.

2. The wireless distribution system of claim 1, wherein the hollow cross-sectional structure is any shape that will support the propagation of electromagnetic energy in a desired frequency range.

3. The wireless distribution system of claim 1, wherein the waveguide operates in one or more waveguide propagation modes.

4. The wireless distribution system of claim 1, wherein the waveguide is metal.

5. The wireless distribution system of claim 1, wherein the wireless distribution system is fabricated with suitable materials to comply with relevant fire safety regulations pertaining to installation of the wireless distribution system in heating, ventilating and air conditioning (HVAC) plenum spaces of a building or in areas containing an explosion-prone atmosphere.

6. The wireless distribution system of claim 1, wherein the wireless distribution system is integrated into architectural features of a building.

7. The wireless distribution system of claim 1, wherein the waveguide is fabricated using a modified, precursor hollow shape.

8. The wireless distribution system of claim 1, wherein the hollow cross-sectional structure is substantially elliptical.

9. The wireless distribution system of claim 1, wherein the hollow cross-sectional structure is substantially rectangular.

10. The wireless distribution system of claim 1, wherein the hollow cross-sectional structure is substantially circular.

11. The wireless distribution system of claim 1, wherein two or more signals of pre-determined frequencies are multiplexed into the wireless waveguide by using one or more propagation modes within the waveguide.

12. The wireless distribution system of claim 1 wherein a distal end of the conductive longitudinal probe extends at least partially into the waveguide.

13. The wireless distribution system of claim 12 wherein a feed point reactance of the distal end of the conductive longitudinal probe is substantially cancelled by the position of the proximal end of the conductive longitudinal probe and the position of a metallic spacer between the hollow center conductor and the conductive longitudinal probe.

14. The wireless distribution system of claim 12 wherein a position of the conductive longitudinal probe can be adjusted to vary the amount of wireless signal energy extracted from the waveguide.

15. The wireless distribution system of claim 12 wherein a position of the conductive longitudinal probe can be adjusted remotely.

16. The wireless distribution system of claim 15, further comprising at least one radio frequency detector coupled to the signal coupling device for monitoring signals at least one predetermined point in the waveguide.

17. The wireless distribution system of claim 15 wherein the signal coupling device has at least one sensor incorporated therein for measuring and reporting mechanical position data of the signal coupling device.

18. The wireless distribution system of claim 1, wherein the waveguide comprises two or more physically separate sections that are joined together to form the wireless waveguide.

19. The wireless distribution system of claim 18, wherein the two or more sections of the wireless waveguide are mechanically and electrically connected using fastened, clam-shell shaped joining devices.

20. The wireless distribution system of claim 18, wherein the two or more sections of the wireless waveguide are mechanically and electrically connected in tandem by using a wrap-around metal sleeve.

21. The wireless distribution system of claim 20, wherein the wrap-around metal sleeve is secured with one or more fastening devices.

22. The wireless distribution system of claim 1, wherein forming and punching processes are used to fabricate wireless waveguides from a starting sheet metal.

23. The wireless distribution system of claim 22, wherein a final sheet metal form is closed through crimping or welding.

24. The wireless distribution system of claim 1, wherein the waveguide is predominantly plastic.

25. The wireless distribution system of claim 24 further comprising one or more electric or magnetic signal coupling devices.

26. The wireless distribution system of claim 24, wherein the waveguide has a thin metallic layer on an inner surface of the waveguide.

27. The wireless distribution system of claim 1 further comprising a magnetic loop probe connected to the conductive longitudinal probe with the magnetic loop probe connected between the conductive longitudinal probe and a base of the conductive longitudinal ground shell.

28. The wireless distribution system of claim 1, further comprising at least one pre-positioned aperture located in a side of the waveguide.

29. The wireless distribution system of claim 28, wherein the pre-positioned aperture is initially covered with removable material that seals and reestablishes the radio frequency integrity of the waveguide when it is placed over the aperture.

30. The wireless distribution system of claim 28, wherein the pre-positioned aperture is a direct radiator from the waveguide to free space.

31. The wireless distribution system of claim 30, wherein the aperture is variable in size of opening.

32. The wireless distribution system of claim 1 further comprising a termination end assembly connected to the waveguide.

33. The wireless distribution system of claim 1, wherein a signal interface assembly is attached to the waveguide and the signal interface assembly is one or more of a transmitter, receiver, transceiver, filter, filters, combiner, duplexer, amplifier, and amplifiers.

34. An electric signal coupler for coupling wireless signals out of and into a waveguide, comprising:
a conductive longitudinal ground shell;
a hollow center conductor contained within the conductive longitudinal ground shell;
a first dielectric contained within a first longitudinal section of the conductive longitudinal ground shell and surrounding the hollow center conductor contained within the first longitudinal section of the conductive longitudinal ground shell;
a second dielectric contained within a second longitudinal section of the conductive longitudinal ground shell and surrounding the hollow center conductor contained within the second longitudinal section of the conductive longitudinal ground shell;
a conductive longitudinal probe contained within the hollow conductor; and
a bidirectional radio frequency port located at an end of the conductive longitudinal ground shell.

35. The electric signal coupler of claim 34 wherein the bidirectional radio frequency port includes a coaxial connector.

36. The electric signal coupler of claim 34 further comprising a metallic spacer coupled to the conductive longitudinal probe that is in low impedance connection with the interior of the hollow center conductor.

37. The electric signal coupler of claim 34 wherein the outer diameter of a portion of the hollow center conductor contained within the second longitudinal section of the conductive longitudinal ground shell is greater than the outer diameter of a portion of the hollow conductor contained within the first longitudinal section of the conductive longitudinal ground shell.

38. The electric signal coupler of claim 34 wherein a portion of the conductive longitudinal probe extends into an inner side of the waveguide.

39. The electric signal coupler of claim 38 wherein the length of the portion of the conductive longitudinal probe that extends into the inner side of the waveguide is adjustable.

40. The electric signal coupler of claim 38 wherein the length of the portion of the conductive longitudinal probe that extends into the inner side of the waveguide is less than a quarter wavelength of an operating frequency of the waveguide.

41. The electric signal coupler of claim 38 further comprising a metallic cylinder coupled to, and coaxial with, the portion of the conductive longitudinal probe that extends into the inner side of the waveguide.

42. The electric signal coupler of claim 41 further comprising a dielectric attachment appended to the metallic cylinder.

43. A magnetic signal coupler for coupling wireless signals out of and into a waveguide, comprising:
a conductive longitudinal ground shell;
a hollow center conductor contained within the conductive longitudinal ground shell;
a first dielectric contained within a first longitudinal section of the conductive longitudinal ground shell and surrounding the hollow center conductor contained within the first longitudinal section of the conductive longitudinal ground shell;
a second dielectric contained within a second longitudinal section of the conductive longitudinal ground shell and surrounding the hollow center conductor contained within the second longitudinal section of the conductive longitudinal ground shell;
a conductive longitudinal probe contained within the hollow conductor;
a magnetic loop probe extending into the waveguide and connected between the conductive longitudinal probe and the conductive longitudinal ground shell; and
a bidirectional radio frequency port coupled to the hollow center conductor and located at an end of the conductive longitudinal ground shell.

44. The magnetic signal coupler of claim 43 wherein a variable amount of signal energy is coupled from the waveguide by varying the size of the magnetic loop probe.

45. The magnetic signal coupler of claim 43 wherein a variable amount of signal energy is coupled from the waveguide by rotating the magnetic loop probe around an axis of the magnetic signal coupler.

46. A wireless distribution system comprising:
a waveguide with a hollow cross-sectional structure and a conductive inner surface that supports the transmission of wireless signal energy from a wireless signal source to a location proximate to a wireless receiver location;
an originating port coupled to the waveguide for injection and extraction of wireless signal energy; and
a signal coupling device coupled to the waveguide, the signal coupling device includes:
an input port for introduction and extraction of wireless signal energy;
an output port for introduction and extraction of wireless signal energy;
an impedance transforming section connected between the input port and the output port;
a conductor at least partially contained within the impedance transforming section; and
a probe coupled to the conductor,
wherein the conductor is configured such that the conductor provides a reactive impedance component that substantially cancels a reactive impedance component of the probe when the probe is contained at least partially within the interior of the waveguide.

47. The wireless distribution system of claim 46 wherein the probe is excited by an electric field within the waveguide.

48. The wireless distribution system of claim 47 wherein the probe is a longitudinal conductor.

49. The wireless distribution system of claim 46 wherein the probe is excited by a magnetic field within the waveguide.

50. The wireless distribution system of claim 49 wherein the probe is a loop-shaped probe connected between the conductor and a ground point on the impedance transforming section.

51. The wireless distribution system of claim 46 further comprising an indicator showing a position of rotation of the signal coupling device around an axis perpendicular to an axis of the waveguide.

* * * * *

UNITED STATES PATENT AND TRADEMARK OFFICE
CERTIFICATE OF CORRECTION

| | | |
|---|---|---|
| PATENT NO. | : 7,606,592 B2 | Page 1 of 1 |
| APPLICATION NO. | : 11/521211 | |
| DATED | : October 20, 2009 | |
| INVENTOR(S) | : Charles D. Becker | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this

Twelfth Day of October, 2010

David J. Kappos
*Director of the United States Patent and Trademark Office*